(12) United States Patent
Arao

(10) Patent No.: US 9,336,055 B2
(45) Date of Patent: May 10, 2016

(54) APPARATUS AND METHOD FOR PREDICTING PROCESSING PERFORMANCE

(71) Applicant: FUJITSU LIMITED, Kawasaki-shi, Kanagawa (JP)

(72) Inventor: Hidekazu Arao, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 14/462,606

(22) Filed: Aug. 19, 2014

(65) Prior Publication Data
US 2014/0359634 A1    Dec. 4, 2014

Related U.S. Application Data

(63) Continuation of application No. PCT/JP2012/057077, filed on Mar. 19, 2012.

(51) Int. Cl.
| G06F 9/46 | (2006.01) |
| G06F 9/50 | (2006.01) |
| G06F 11/34 | (2006.01) |
| G06F 9/48 | (2006.01) |

(52) U.S. Cl.
CPC ............ G06F 9/5005 (2013.01); G06F 9/4881 (2013.01); G06F 9/5011 (2013.01); G06F 11/3423 (2013.01); G06F 11/3447 (2013.01); G06F 11/3485 (2013.01)

(58) Field of Classification Search
CPC ................................ G06F 9/4881; G06F 9/52
USPC .................................................. 718/102, 104
See application file for complete search history.

(56) References Cited

U.S. PATENT DOCUMENTS

| 7,406,688 | B2 * | 7/2008 | Shibayama | ........... G06F 9/5066 718/101 |
| 2007/0266391 | A1 * | 11/2007 | Hoffman | ............. G06F 11/3419 718/106 |
| 2012/0317578 | A1 * | 12/2012 | Kansal | .................. G06F 9/5077 718/104 |

FOREIGN PATENT DOCUMENTS

| JP | H07-295864 A | 11/1995 |
| JP | H08-137725 A | 5/1996 |
| JP | 2001-125784 A | 5/2001 |
| JP | 2004-264954 A | 9/2004 |

OTHER PUBLICATIONS

International Search Report, mailed in connection with PCT/JP2012/057077 and mailed May 29, 2012(Total number of pp. 1).

* cited by examiner

*Primary Examiner* — Andy Ho
(74) *Attorney, Agent, or Firm* — Fujitsu Patent Center

(57) ABSTRACT

An information processing method includes acquiring sets of execution information of a plurality of information processes executed by a first information processing apparatus, converting the usage time in each set of execution information into usage time on a second information processing apparatus, executing a resource allocation process of allocating the resource of the second information processing apparatus to a first information process during the converted usage time, allocating the resource of the second information processing apparatus to a second information process for idle time not allocated to the first information process during the converted usage time, and accumulating virtual run time of the allocated resources, and estimating execution time when executing the plurality of information processes on the second information processing apparatus on the basis of the accumulated virtual run time.

9 Claims, 23 Drawing Sheets

FIG.10

| JOB PROGRAM NAME |
| --- |
| DEVICE NAME OR MACHINE TYPE NAME OF DEVICE (CPU, DISK, ETC.) |
| PROCESSING TIME |
| NEXT TASK ADDRESS |
| VIRTUAL RUN ACCUMULATIVE PROCESSING TIME |
| VIRTUAL RUN UNPROCESSED TASK ACCUMULATIVE PROCESSING TIME |
| VIRTUAL RUN NEXT TASK ADDRESS |

FIG.21

| JOB A ELAPSE OF TIME | JOB B ELAPSE OF TIME |
|---|---|
| 1.5 | 0.5 |
| ↓ | ↓ |
| 3.5 | 2.5 |
| ↓ | ↓ |
| 5.0 | 4.5 |
| ↓ | ↓ |
| 8.5 | 6.5 |
| ↓ | ↓ |
| 10.5 | 9.5 |
| ↓ | |
| 13.5 | |

APPARATUS AND METHOD FOR PREDICTING PROCESSING PERFORMANCE

CROSS-REFERENCE TO RELATED APPLICATION

This application is a continuation application of International Application PCT/JP2012/057077 filed on Mar. 19, 2012 and designated the U.S., the entire contents of which are incorporated herein by reference.

FIELD

The embodiments discussed herein are related to prediction of performance of an information processing apparatus.

BACKGROUND

In the case of introducing a new computer, it follows that a machine type for the introduction thereof is selected from plural types of machines each exhibiting different performance. One of criteria for selecting the machine type for the introduction is a selection criterion based on predicting whether a desired level of processing performance can be attained or not, alternatively whether a desired job can be processed within a desired period of processing time or not.

A conventional method of predicting the processing performance or the processing time described above is that a person predicts the processing performance, e.g., the processing time expended on executing a target process on the basis of manufacturer's announced CPU ability values and DISK ability values from processing performance information that is actually measured on, e.g., an active computer at the present as the case may be.

FIG. 1 is a diagram illustrating a procedure in the case of predicting the processing performance of a computer. In the example of FIG. 1, the active computer at the present executes a job program desired by a user such as a job program A, a job program B, etc. With the execution of the job program A etc., a Central Processing Unit (CPU) or an external storage device (e.g., DISK) etc. defined as resources of the computer are sequentially used under management of an Operating System (OS). The OS can extract processing performance information with the execution of the job program A etc. The processing performance information contains, e.g., CPU time when executing the job program A and DISK time. The DISK time is also called input/output time (I/O time). Extracted also in the example of FIG. 1 are the CPU time when executing the job program B concurrently with the execution of the job program A and the DISK time.

On the other hand, normally the manufacturers of the computers announce relative ability values of both of the active computer at the present and computers as candidates for the introduction. Accordingly, the extracted items of processing performance information are converted based on the announced relative ability values of the computers, and the processing performance information of the computers as the candidates for the introduction is respectively estimated as well.

While on the other hand, the following technology is also known by way of a processing performance prediction of predicting a variation in processing performance, which occur due to a change of a system configuration. Namely, in a job of the computer, an average period of usage time per once is obtained based on usage time and a usage count of each resource used by the job. Then, the usage time of each resource is changed by referring to a hardware processing ability information storage unit. Subsequently, the usage time of each resource and waiting time of each resource are obtained by performing a simulation.

DOCUMENT OF PRIOR ART

Patent Document

[Patent Document 1] Japanese Laid-Open Patent Publication No. 08-137725

[Patent Document 2] Japanese Laid-Open Patent Publication No. 07-295864

SUMMARY

According to an aspect of the embodiments, an information processing method includes acquiring, when a first information processing apparatus executes a plurality of information processes, sets of execution information of the respective information processes, the execution information recorded as task information being structured to contain the resources used in the respective information processes and usage time of the resources in a sequence of switching over with each switchover of the resource used in the information process, converting the usage time in each set of execution information into usage time on a second information processing apparatus in accordance with ability value information of the resources of the first information processing apparatus and ability value information of the resources of the second information processing apparatus, executing, with respect to the plurality of executed information processes, a resource allocation process based on the sets of execution information corresponding to the plurality of information processes, the resource allocation process being allocating the resource of the second information processing apparatus that corresponds to the resource of the first information processing apparatus to a first information process during the converted usage time in the resource switchover sequence in accordance with the task information recorded in the execution information corresponding to the first information process, allocating the resource of the second information processing apparatus to a second information process for idle time not allocated to the first information process during the converted usage time in the resource switchover sequence in accordance with the task information recorded in the execution information corresponding to the second information process and accumulating periods of virtual run time of the allocated resources and estimating execution time when executing the plurality of information processes on the second information processing apparatus on the basis of an accumulative value obtained by accumulating the virtual run time of the allocated resources up to tail task information contained in the respective sets of execution information corresponding to the plurality of information processes.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 10 is a diagram illustrating management information;

FIG. 21 is a diagram illustrating variations of accumulative values of periods of processing time of each job process when finishing all the tasks of the job task queue;

DESCRIPTION OF EMBODIMENTS

The simulation in the conventional technology is performed based on an average value of the usage time per once, which is obtained on the basis of the time for which each resource is used and a usage count thereof.

Therefore, in the simulation based on the average value described above, an execution sequence of a plurality of processes is different from an actual execution sequence on the computer, resulting in a possibility that accuracy of predicting the processing performance is not sufficient.

A mode (which will hereinafter be referred to as an embodiment) for carrying out one aspect of a technology of the disclosure will hereinafter be described with reference to the drawings. A configuration of the following embodiment is an exemplification, and the present invention is not limited to the configuration of the embodiment.

Example 1

An information processing apparatus 10 according to the Example 1 will hereinafter be described with reference to the drawings of FIGS. 2 through 13.

<Configuration of Information Processing Apparatus>

Figure 1:
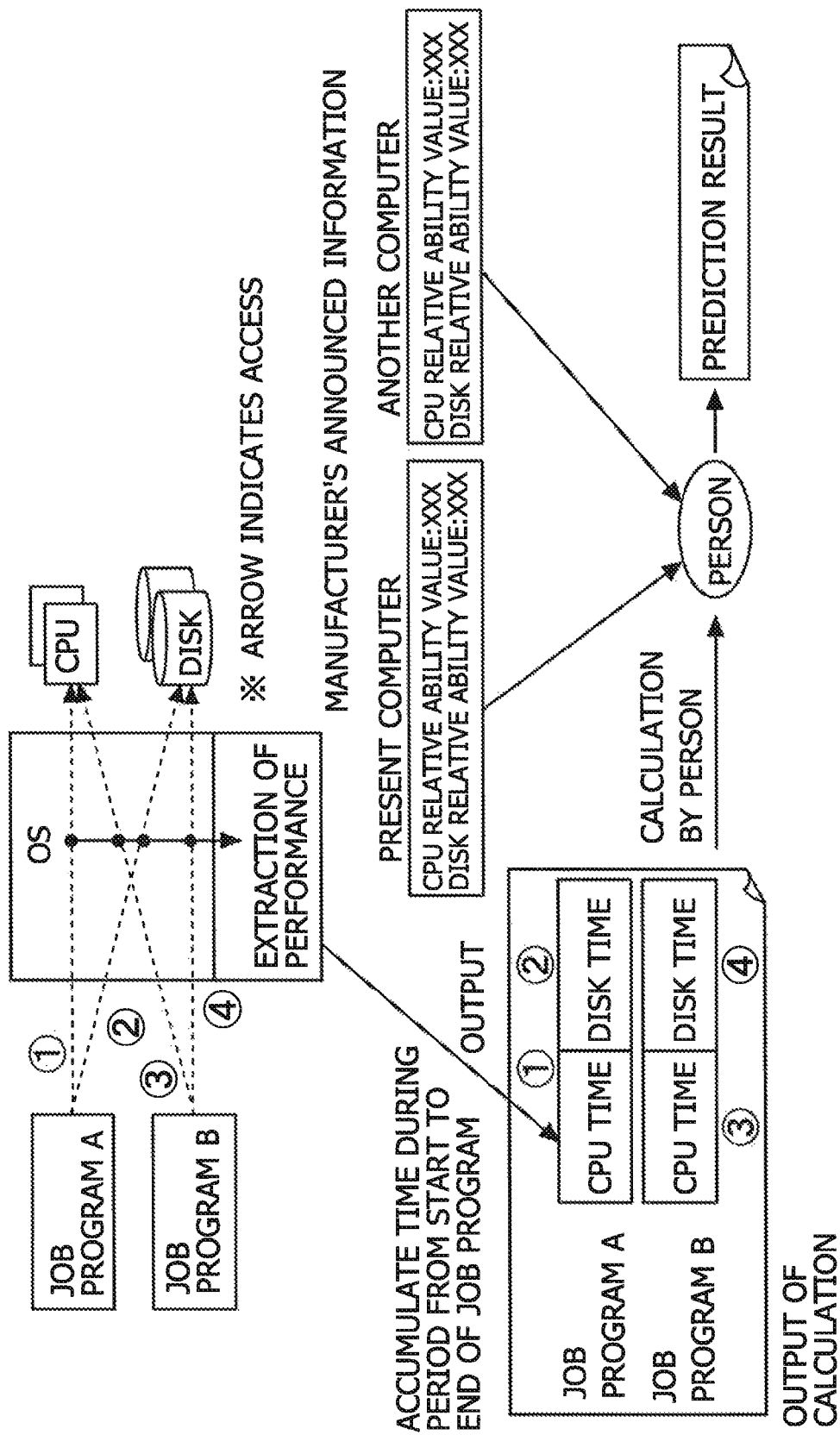
FIG. 1 is a diagram illustrating a procedure in the case of predicting processing performance of a computer.
Figure 2:
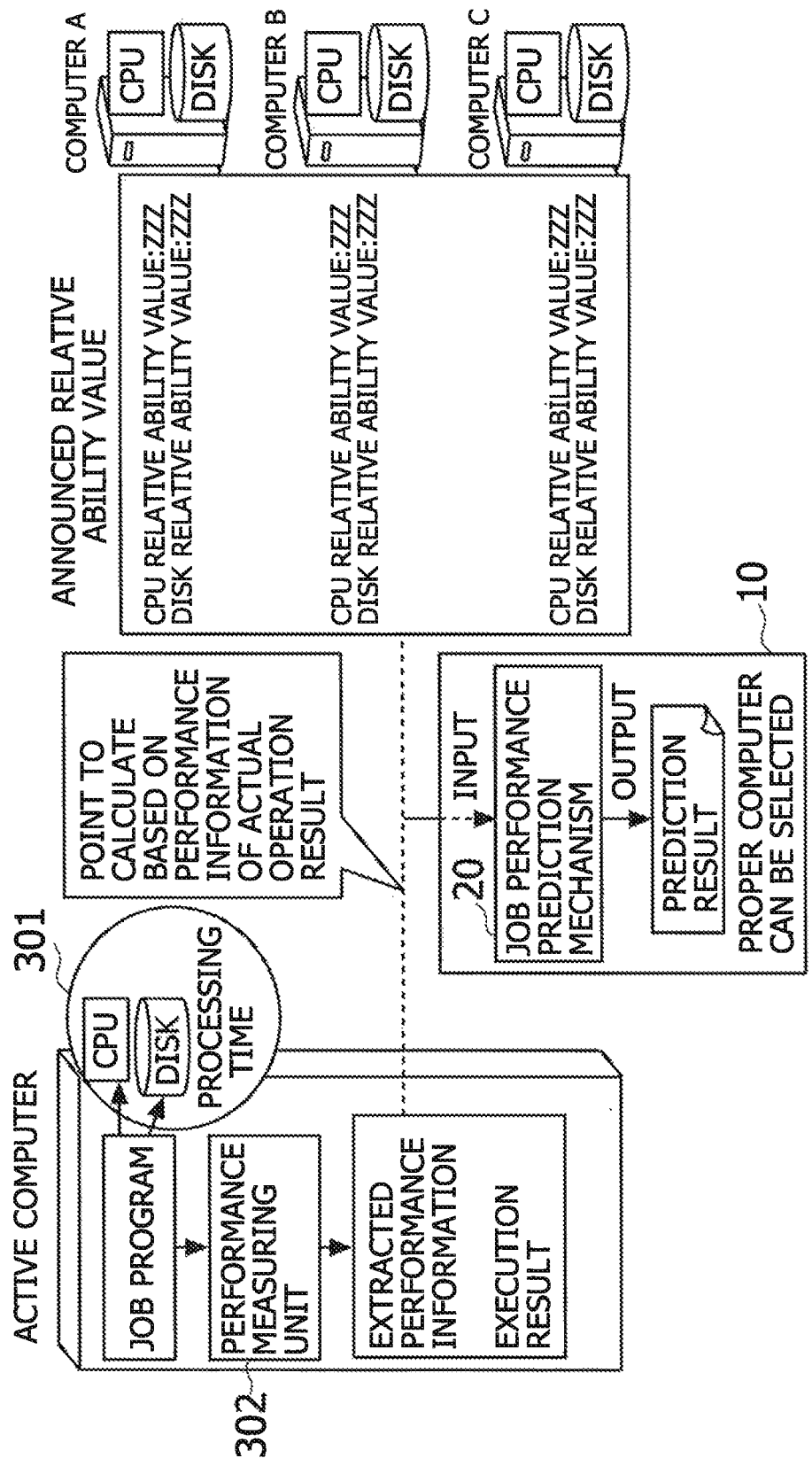
FIG. 2 is a diagram illustrating functions of the information processing apparatus according to Example 1.

FIG. 2 illustrates functions of the information processing apparatus 10 according to the Example 1. As in FIG. 2, the information processing apparatus 10 predicts processing performance of other computers defined as performance information prediction target apparatuses from performance information measured on one computer. Herein, one computer is defined as, e.g., a computer being active in operation now, while other computers are defined as candidate computers to be introduced.

An example in FIG. 2 is that the information processing apparatus 10 acquires at first the performance information measured on the active computer 301 at the present during an execution of a job process by a job program, and acquires released relative ability values of the introduction candidate computers (A, B, C, etc.). A process realized by the computer executing the job program will hereinafter be simply termed a "job process".

The active computer 301 at the present includes a performance measuring unit 302 to measure the performance information given when executing the job program. The performance measuring unit 302 measures, e.g., periods of processing time such as CPU time, DISK time when executing the job program, and outputs the performance information containing the measured periods of processing time. A CPU of the computer 301 functions as the performance measuring unit 302 by executing a computer program loaded on, e.g., a main storage device in an executable manner.

Further, the information processing apparatus 10 includes a job performance prediction mechanism 20. The CPU of the information processing apparatus 10 functions as the job performance prediction mechanism 20 by executing, e.g., the computer program loaded on, e.g., the main storage device in the executable manner. Note that the information processing apparatus 10 functioning as the job performance prediction mechanism 20 may be the computer 301 and may also be another computer.

The job performance prediction mechanism 20 automatically calculates the processing performance of other computers, e.g., the periods of processing time when executing a predetermined job process on the basis of the performance information measured on the active computer 301 at the present, the released relative ability value of the computer 301 and the released relative ability values of other computers A, B, C, etc.

Herein, a method to input the relative ability value of each computer is not limited. For example, the information processing apparatus 10 may acquire the relative ability values of the respective computers from on an open Website on the Internet. Further, an operator, who operates the information processing apparatus 10, may input the relative ability values to the information processing apparatus 10 on the basis of released information. Still further, the relative ability value of the active computer 301 at the present may also be information stored in the computer 301 itself.

In the embodiment, the "relative ability value" connotes a value obtained by relatively comparing "1.0" set as an ability value of the apparatus at a certain point in the past with an ability value of another apparatus provided from this point onward. In the case of the relative ability value being "2.0", this value implies a twofold improvement of the processing performance as compared with the computer of which the relative ability value is "1.0". For instance, in the case of the CPUs, there are released the relative ability values based on a computer benchmark specification SPECint2000#rate and the relative ability values given as maker's own evaluation results. Hence, the embodiment takes an expression as the relative ability value, however, available substitutes for the relative ability values are a performance value measured on a predetermined rule, a number of integer arithmetic operations or floating-point arithmetic operations per unit time in the CPU, a data transfer speed to a hard disk, etc.

The job performance prediction mechanism 20 generates information of a managed unit called a "task" out of the performance information measured on the computer 301 when executing the job process, the task being generated by subdividing a CPU process and a DISK process of each job process. In other words, when the computer 301 executes a job program for the job process, the processes such as the CPU process, the DISK process and other IO processes are divided into processing units and thus managed on the computer 301. The computer 301 executes the job program per divided processing unit by use of the CPU or the DISK. This divided processing unit on the computer 301 is called a "task" in the Example 1. The job performance prediction mechanism 20 generates a chain of processes called a job task queue by sequentially chaining the divided tasks. Accordingly, a status of executing one single job program on the computer 301 is expressed by a plurality of tasks chained in an execution sequence in the job task queue.

Next, the job performance prediction mechanism 20 allocates the tasks chained in the execution sequence in the job task queue to other computers A etc. that are different in terms of their CPU abilities, DISK abilities and the numbers thereof, in which the allocated tasks run virtually thereon. Herein, a connotation of the "virtual run" is that resources specified by the respective tasks chained to the job task queue and periods of usage time are reallocated to resources possessed by other computers A etc. in the sequence of their being chained to the job task queue. In this virtual run, it happens as the case may be that a way of the tasks being chained varies due to performance differences between the resources of the originally active computer 301 and the resources of other computers A etc. For example, it may happen between the task of the CPU process and the DISK process that idle time occurs or expires, or a length of the idle time varies. Incidentally, it is assumed in the virtual run according to the Example 1 that a plurality of tasks chained to the same job task queue is not executed in parallel. The discussion will be made on the assumption that, e.g., the task of the CPU process and the task of the DISK process, which are contained in one single job process, are to be sequentially executed.

The job performance prediction mechanism 20 calculates a period of processing time in the virtual run from the processing time of the job process of the computer 301 utilized at the present on a task-by-task basis while virtually running the tasks, the relative ability value of the computer 301 utilized at the present and the relative ability values of other computers A etc., and accumulates the calculated processing time. The virtual run described above is what simulates a process in which to reflect a switchover of the actual task or a resource management of other computers A etc., and hence the job performance prediction mechanism 20 can highly accurately calculate the periods of processing time of the job processes of other computers A etc.

Further, the job performance prediction mechanism 20, when virtually running the tasks chained to a plurality of job task queues corresponding to respective job programs for executing the plurality of processes, may allocate priority levels to the tasks of the respective job programs on the basis of execution priority levels specified in the job programs, and may virtually run the tasks.

Furthermore, the job performance prediction mechanism 20, when virtually running the tasks, generates an unprocessed task for indicating a period of task disable time till starting the next task after finishing one task in each resource. The job performance prediction mechanism 20 collects pieces of information on a period of resource usage time and a period of non-usage time thereof by embedding the unprocessed task between the execution of one task in each resource and the execution of the next task, thus determining an execution status, e.g., a resource usage ratio (which is also referred to as a resource occupancy) etc.

Note that the embodiment involves using a DISK device as an I/O device, however, it does not mean that the I/O device analyzed by the job performance prediction mechanism 20 is limited to the DISK device, and the analysis can be attained by the same method as in the embodiment also by using other I/O devices employed for executions of the job programs, e.g., a network access communication device, a portable storage device, etc.

Figure 3:
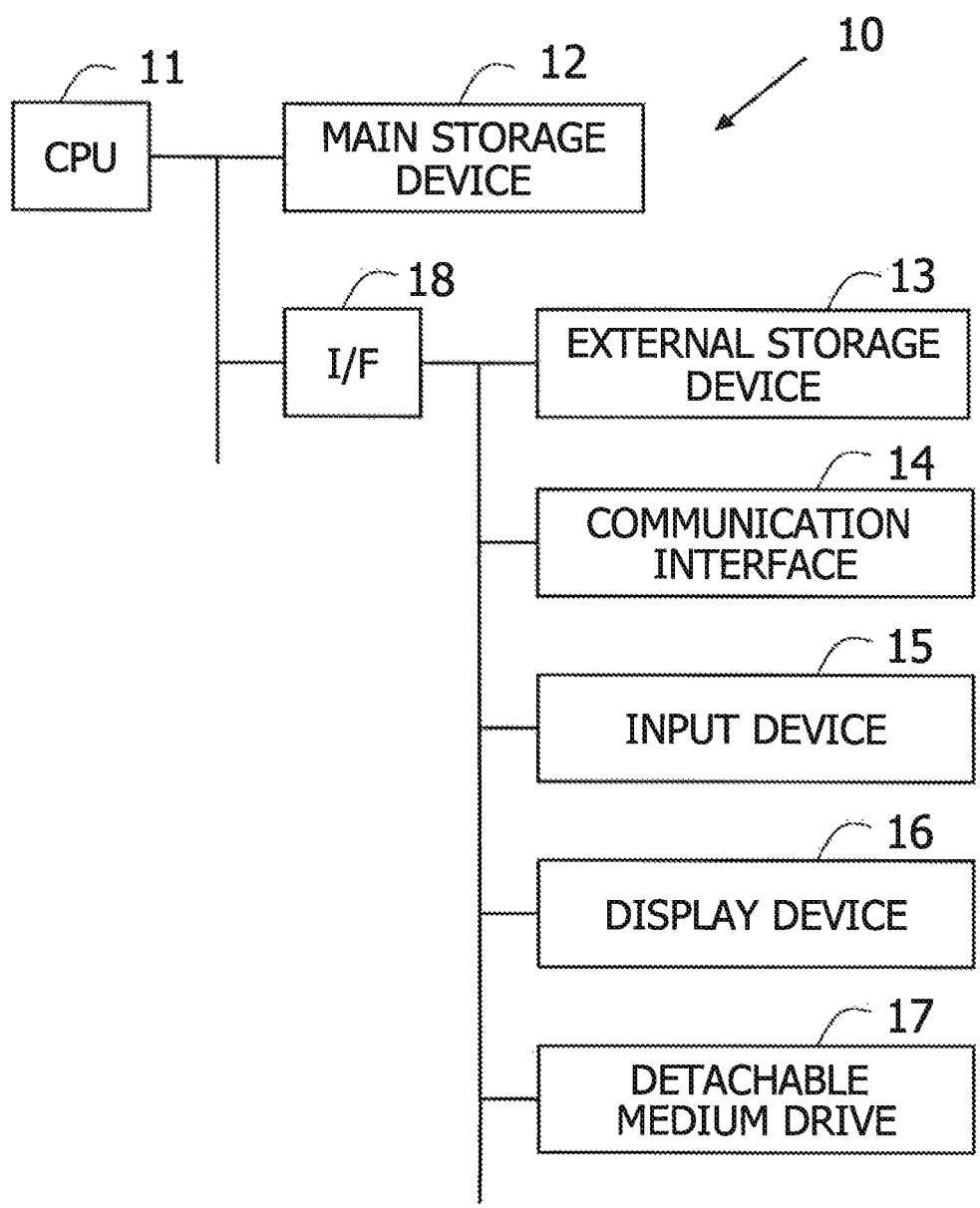
FIG. 3 is a diagram illustrating a hardware configuration of the information processing apparatus.

FIG. 3 illustrates a hardware configuration of the information processing apparatus 10. The information processing apparatus 10 includes a Central Processing Unit (CPU) 11, a main storage device 12 and external devices connected thereto via an interface 18, and executes an information process based on a program. The external devices can be exemplified by an external storage device 13 and a communication interface 14. The CPU 11 executes the computer program loaded on the main storage device 12 in the executable manner, thereby providing functions of the information processing apparatus 10. The main storage device 12 stores the computer program to be executed by the CPU 11 and data etc. to be processed by the CPU 11. The main storage device 12 is exemplified such as a Dynamic Random Access Memory (DRAM), a Static Random Access Memory (SRAM) and a Read Only Memory (ROM). Further, the external storage device 13 is used as a storage area to assist the main storage device 12 and stores the computer program to be executed by the CPU 11 and the data etc. to be processed by the CPU 11. The external storage device 13 is exemplified by a hard disk drive, a Solid State Disk (SSD), etc.

Moreover, the information processing apparatus 10 may also be configured to include a user interface using an input device 15, a display device 16, etc. The input device 15 is, e.g., a keyboard, a pointing device and so on. Further, the display device 16 is, for instance, a liquid crystal display, an electroluminescence panel, etc. Still further, the information processing apparatus 10 may also be provided with a detachable storage medium drive 17. A detachable storage medium is exemplified by a Blu-ray disc, a Digital Versatile Disk (DVD), a Compact Disc (CD), a flash memory card, etc. Note that the single interface 18 is illustrated in the example of FIG. 3, however, plural types of interfaces 18 may also be provided.

<Performance Measuring Unit>

Figure 4:
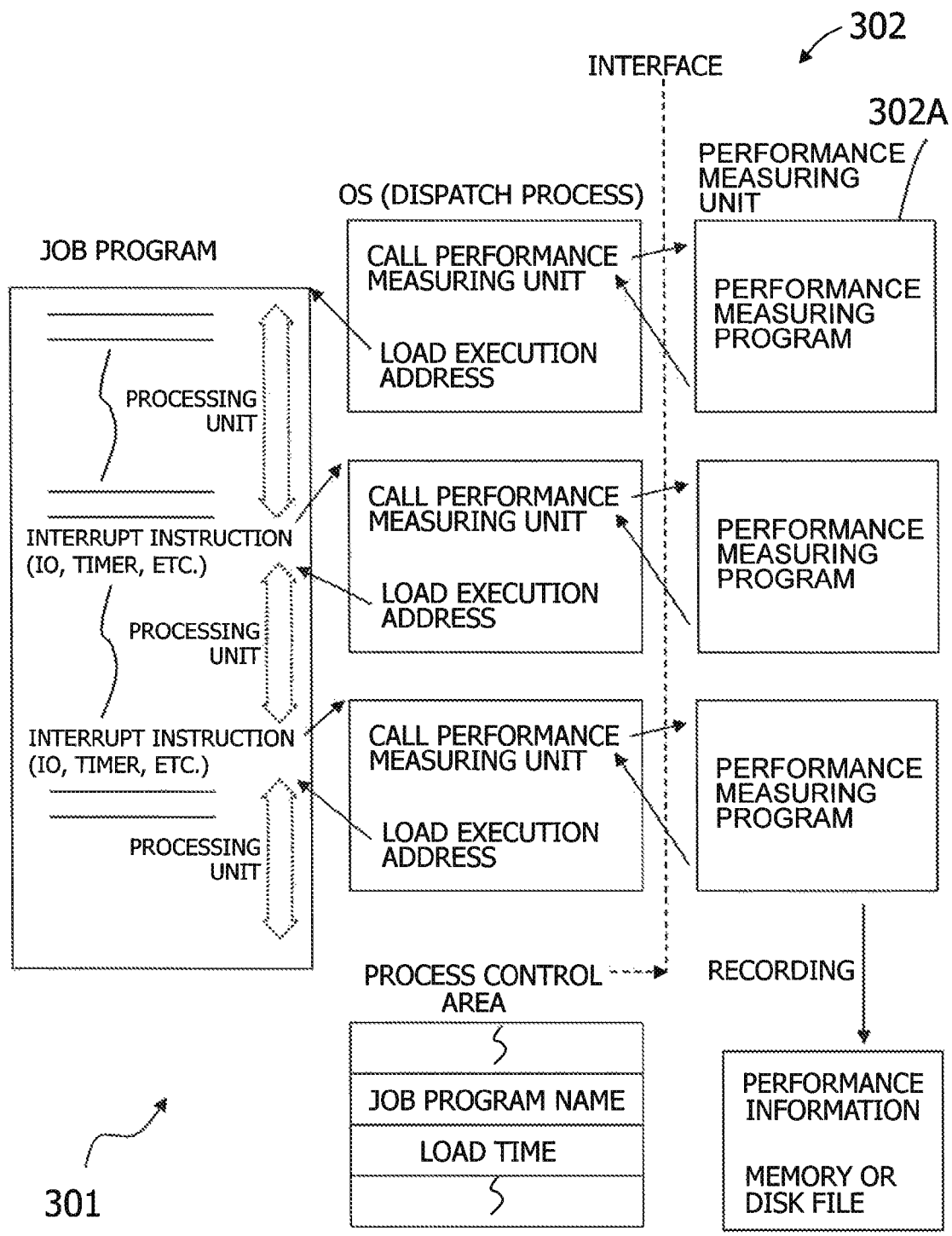
FIG. 4 is a diagram illustrating a relationship between a performance measuring unit and a job program.

FIG. 4 depicts a relation between the performance measuring unit 302 and the job program. FIG. 4 illustrates an example of how the performance measuring unit 302 measures the CPU time. It is feasible to measure the DISK time when the DISK device performs processing, I/O time when the I/O device performs processing, etc. with the same structure and in the same procedure as those in FIG. 4. The job program, an Operating System (OS) and a performance measuring program 302A to make the CPU function as the performance measuring unit 302 are, as in FIG. 4, executed on the active computer 301 with the CPU time being measured. A process provided by the CPU 11 executing the performance measuring program 302A will hereinafter be described simply as a process to be executed by the performance measuring unit 302.

The job program is allocated with the CPU per processing unit of the CPU process, e.g., at a time interval of issuing an interrupt, and is thereby executed. The interrupt is issued when executing an I/O instruction (interrupt instruction) to the external storage device, the communication device and other peripheral devices during the execution of the job program. Further, the interrupt is also issued when a timer is timed out. Moreover, the interrupt is issued also when a wait target event occurs during execution of a wait instruction such as "WAIT" for synchronizing with other devices.

Upon issuing the interrupt, a context such as a content of a register is saved in a memory, and the CPU process of the job program is temporarily interrupted. Then, the job program waits for executing the next task.

The OS includes a dispatch processing module to control the run of the job program. The dispatch processing module of the OS will hereinafter be simply called the OS. Herein, the term "control" connotes, e.g., a process to start the CPU by allocating the CPU to the task of a job program B waiting for the execution when interrupting the task of a job program A in execution. Hereat, the OS at first invokes the performance measuring unit 302, i.e., the performance measuring program 302A. The invoking process is depicted as a "CALL performance measuring unit" in FIG. 4. Then, the OS sets an execution address of the job program B on the main storage device in the CPU (a program counter), and starts the task. The starting process is depicted as a "LOAD execution address in FIG. 4.

The performance measuring unit 302, when started, executes the performance measuring process and measures the performance information. The performance measuring unit 302 records the measured performance information in the main storage device (memory), a DISK file, etc.

Figure 5:
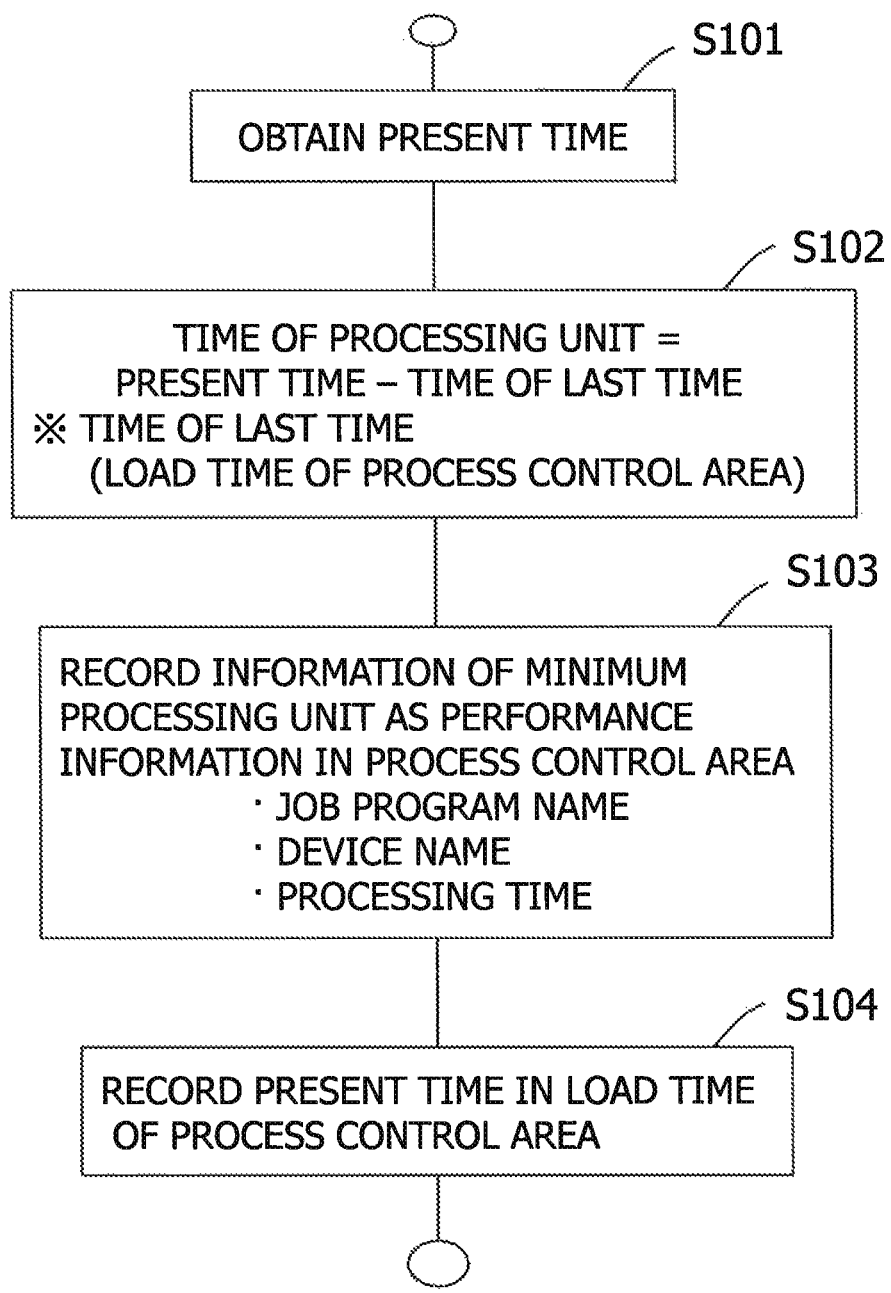
FIG. 5 is a flowchart illustrating processes of a performance measuring unit 302.

FIG. 5 illustrates a process of the performance measuring unit 302. In this process, the performance measuring unit 302, to begin with, obtains the present time (S101). Herein, the "present time" represents elapse time since predetermined reference time and can be also called the present time of day. The present time can be obtained from, e.g., the OS. Then, the performance measuring unit 302 obtains time of the processing unit from this formula: Time of Processing Unit=Present Time−Time of Last Time (S102). Note that the time of the last time is saved in, e.g., an area (called a process control area) on the main storage device to store the time of the last time. It may be sufficient that the process control area is ensured in an area other than a dynamic operation area ensured when in the execution of the performance measuring unit 302, e.g., in an area storing the management information of the OS. Note that the time of the processing unit represents execution time of the task defined as the processing unit and will hereinafter be simply called the processing time.

Then, the performance measuring unit 302 records items of information containing the processing time as the performance information in the process control area (S103). To be more specific, the performance information contains, e.g., a job program name, a device name (names of the resources such as the CPU and the DISK) and the processing time. It may be sufficient that the job program name and the device name are obtained from the OS, e.g., when starting the performance measuring unit 302. Note that the devices specified by the device names such as the CPU and the DISK are given by way of one example of the resources. Further, the resources of the computer are also termed the devices in the Example 1.

Moreover, the performance measuring unit 302 records the present time acquired in S101 in an address corresponding to "LOAD time" in the process control area (S104). Through the processes described above, the performance measuring unit 302 records, whenever invoked, the processing time from the last time.

Figure 6:
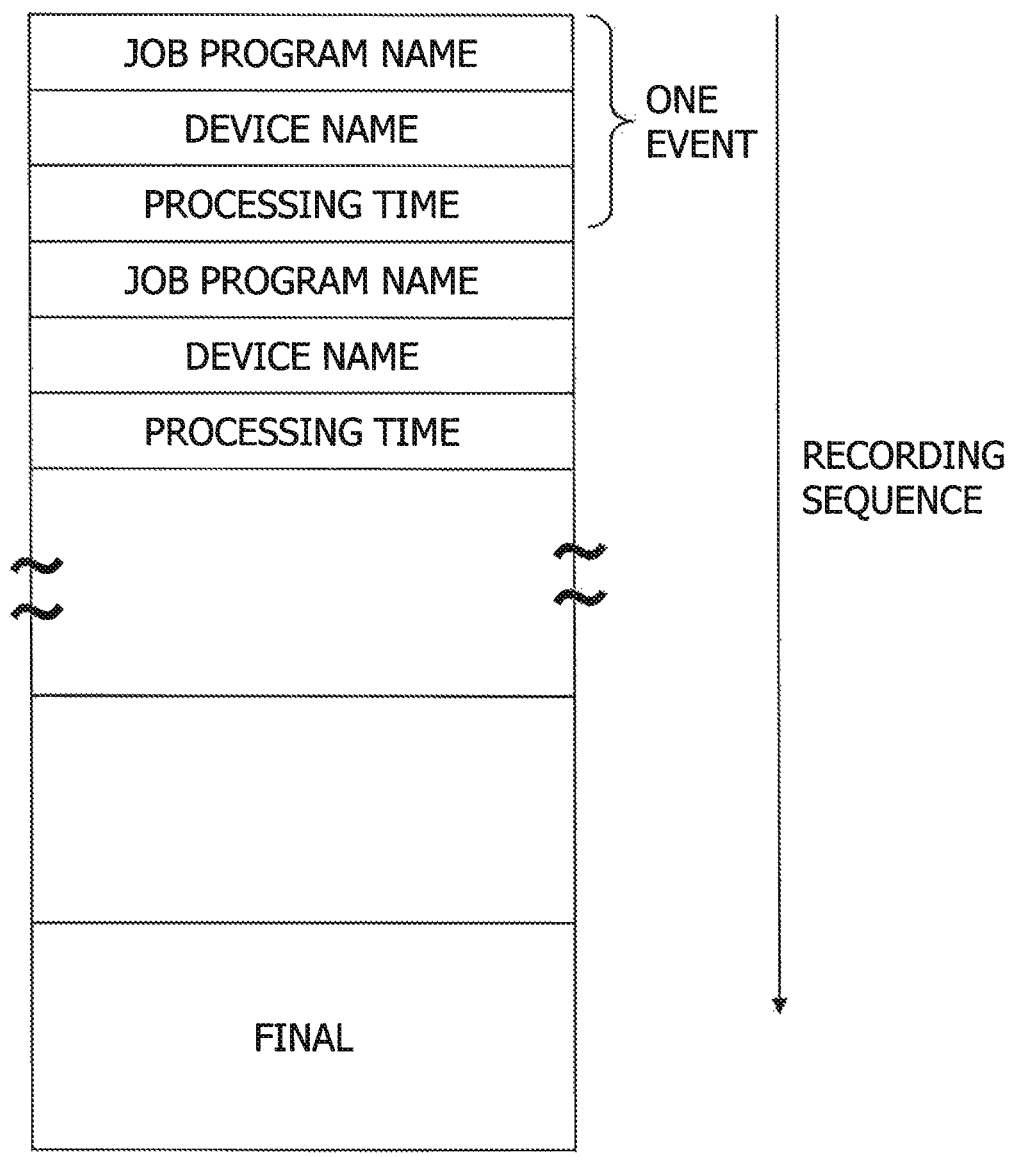
FIG. 6 is a diagram illustrating a format of performance information recorded by the performance measuring unit 302.

FIG. 6 illustrates a format of the performance information recorded by the performance measuring unit 302. The performance measuring unit 302, whenever started, records the measured performance information on the processing unit, i.e., on the task-by-task basis in a measuring sequence. As in FIG. 6, it may be sufficient that the item of performance information is recorded in a set of the job program name, the device name and the processing time.

A recording destination of the performance information may be set on the main storage device. However, the computer, of which the performance information is measured, may be configured to store the performance information, after being temporarily retained on the main storage device, finally in a file on the external storage device, e.g., the DISK. The recorded performance information becomes input information to the job performance prediction mechanism 20.

Incidentally, in the case of measuring the DISK time, it may be sufficient that a DISK performance measuring unit similar to the performance measuring unit 302 is started in the way of coupling an event of starting the I/O process to the external storage device 13 with an event of issuing the interrupt indicating a completion of the execution of the I/O process from the external storage device 13. Then, it may be sufficient that the DISK performance measuring unit sets, as the DISK time, a differential value between the time when started first time (when starting the I/O process) and the time when started second time (when issuing the interrupt indicating the completion of the execution), and records the DISK time together with the device name (DISK) and the job program name as the performance information. Further, the same method of measuring the DISK time can be also applied to the I/O time of each of the I/O devices other than the DISK.

<Job Performance Prediction Mechanism>

Figure 7:
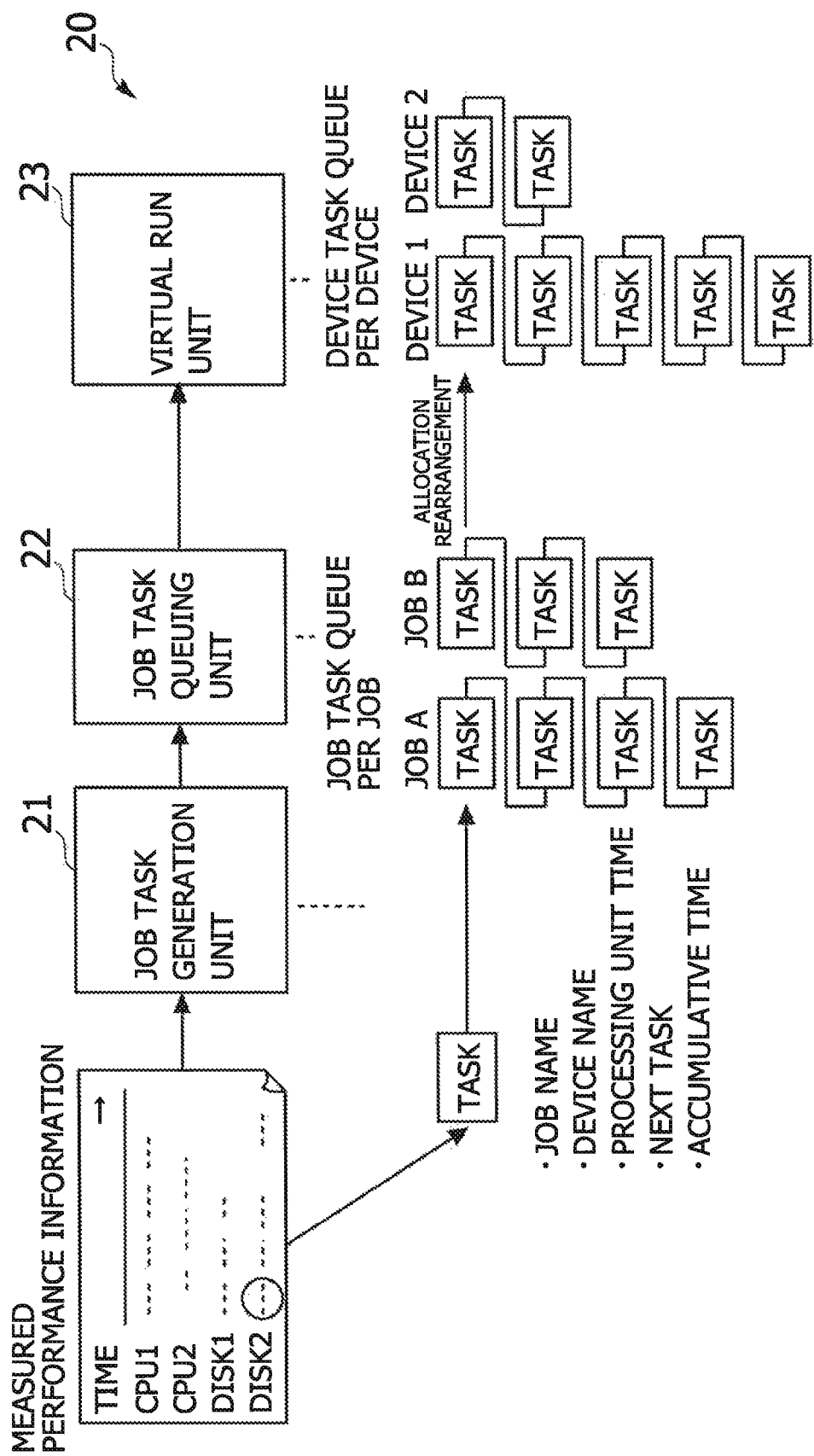
FIG. 7 is a diagram illustrating a structure of a job performance prediction mechanism.

FIG. 7 illustrates a structure of the job performance prediction mechanism 20. The job performance prediction mechanism 20 includes a job task generation unit 21, a job task queuing unit 22 and a virtual run unit 23. The CPU 11 of the information processing apparatus 10 starts the processes in the sequence of, e.g., the job task generation unit 21, the job task queuing unit 22 and the virtual run unit 23.

(Job Task Generation Unit 21)

The job task generation unit 21 processes the performance information, which is recorded by the performance measuring unit 302 in the active computer 301, as input information. Then, the job task generation unit 21 generates management information indicating, e.g., the CPU process or the DISK process per task from the performance information measured when executing each job program. The management information is given by way one example of task information.

FIG. 10 depicts the management information. The management information is exemplified as a data structure on the main storage device 12. The management information contains at least the job program name, the device name and the processing time. The job program name, the device name and the processing time are obtained from the performance information.

Namely, the job program name is information for determining which job program the task runs due to the execution of. The device name is information for identifying one or a plurality of CPUs, information for identifying one or a plurality of DISKs, and so forth. The device name is the information for determining which CPU or DISK the task is executed on. Note that the device name may be replaced with a number for uniquely identifying the device, e.g., a device serial number etc. The processing time is time for which each task performs processing.

In an example of FIG. 10, the management information further contains a NEXT task address, virtual run accumulative processing time, virtual run unprocessed task accumulative processing time and a virtual run NEXT task address.

A head address of the management information of the next task is recorded in "the NEXT task address" in order to chain the respective tasks in the execution sequence. Namely, the NEXT task address is information for saving the sequence of the tasks recorded by the performance measuring unit 302.

The virtual run accumulative processing time, the virtual run unprocessed task accumulative processing time and the virtual run NEXT task address are items of information for recording the performance information per device when virtually running, on the information processing apparatus 10, the respective tasks chained based on the performance information recorded by the active computer.

An implication of "virtually running the respective tasks on the information processing apparatus 10" is that the tasks generated based on the performance information recorded by the active computer are made to run in accordance with the resources and the relative ability value of the performance prediction target computer. In the virtual run, the execution time of each task is converted based on the relative ability value of the active computer and the relative ability value of the performance prediction target computer. Further, the conversion of the execution time of each of the tasks has a possibility that the task execution sequence in the virtual run is different from the execution sequence on the active computer with the performance information being measured. Accordingly, the virtual run enables the calculation of the execution time of the job process on the performance prediction target computer, i.e., the calculation of the predictive value of the processing performance of the computer when executing the job process on the information processing apparatus 10.

"The virtual run accumulative processing time" records the accumulative processing time to be added up when virtually running the tasks. When completing the virtual run, it follows that a value of the virtual run accumulative processing time within the final task becomes a predictive value of the processing time of the job process. The virtual run accumulative processing time is given by way of one example of an accumulative value of usage time of a device.

"The virtual run unprocessed task accumulative processing time" records the accumulative processing time of the unprocessed tasks when virtually running the tasks. The "unprocessed task" is a task that is generated for the convenience's sake in order to manage the idle time of the device, the task running in a status of not allocating the job program to the device of the performance prediction target computer. When completing the virtual run, it follows that a value of the virtual run unprocessed task accumulative processing time within the final task in each device task queue becomes a non-operating time of the relevant device, whereby a CPU load (corresponding to the usage ratio) and a DISK load can be calculated. The virtual run unprocessed task accumulative processing time is given by way of one example of an accumulative value of non-usage time.

"The virtual run NEXT task address" records the head address of the management information of the next task in order to chain the tasks per device when virtually running the tasks. For the final task, the value of the virtual run NEXT task address is set to "0". A value "0" implies being "final".

(Job Task Queuing Unit 22)

Figure 11:
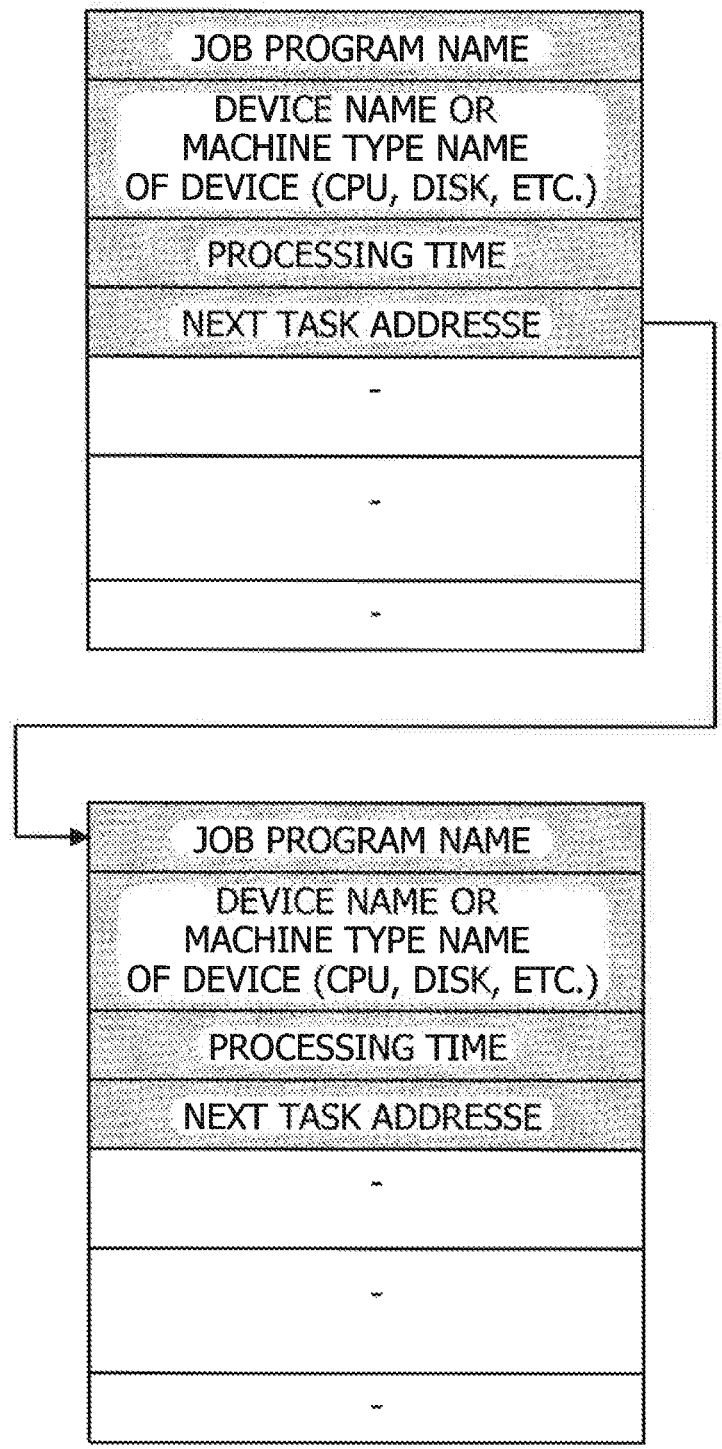
FIG. 11 is a diagram illustrating a structure of task management information linked by a NEXT task address and containing converted processing time.

Referring back to FIG. 7, the job task queuing unit 22 divides sets of the management information of the subdivided tasks by the job and concatenates these sets of management information per job. The management information concatenated per job process is given by way of one example of execution information. The term "concatenate" connotes also "connecting" or "queuing". It may be sufficient that the job task queuing unit 22 sets the head address of the management information of the next task as a NEXT task address of the management information (FIG. 10) in the sequence of the performance information measured by the performance measuring unit 302. Further, the job task queuing unit 22 converts the processing time of the chained task on the basis of a ratio of the relative ability value of the performance information measuring computer to the relative ability value of the performance prediction target computer. FIG. 11 illustrates a structure of the task management information linked by the NEXT task address and containing the converted processing time.

The job task generation unit 21 and the job task queuing unit 22 are given by way of one example of means to acquire. Moreover, the job task queuing unit 22 is also given by way of one example of means to convert. Hence, the job task generation unit 21 and the job task queuing unit 22 may be configured into one integrated unit.

(Virtual Run Unit 23)

The virtual run unit 23 prepares the device task queues as many as the number of devices (number of CPUs, number of DISKs) of the processing performance prediction target computer. Then, the virtual run unit 23 sequentially allocates the respective tasks of the job task generated by the job task queuing unit 22 to the device task queues. Herein, the device task queue connotes a line into which the sets of management information of the respective tasks of the job task are concatenated on a device-by-device basis.

The virtual run unit 23 obtains the accumulative time when allocating the tasks to the device and records the obtained accumulative time in the task. When finishing allocating the tasks of the job task to the device task queue, it follows that the final task accumulative time becomes the processing time of the relevant job. The virtual run unit 23 outputs the task accumulative time as the job processing time on the computer to be introduced. The virtual run unit 23 is given by way of one example of execution means.

Figure 12:
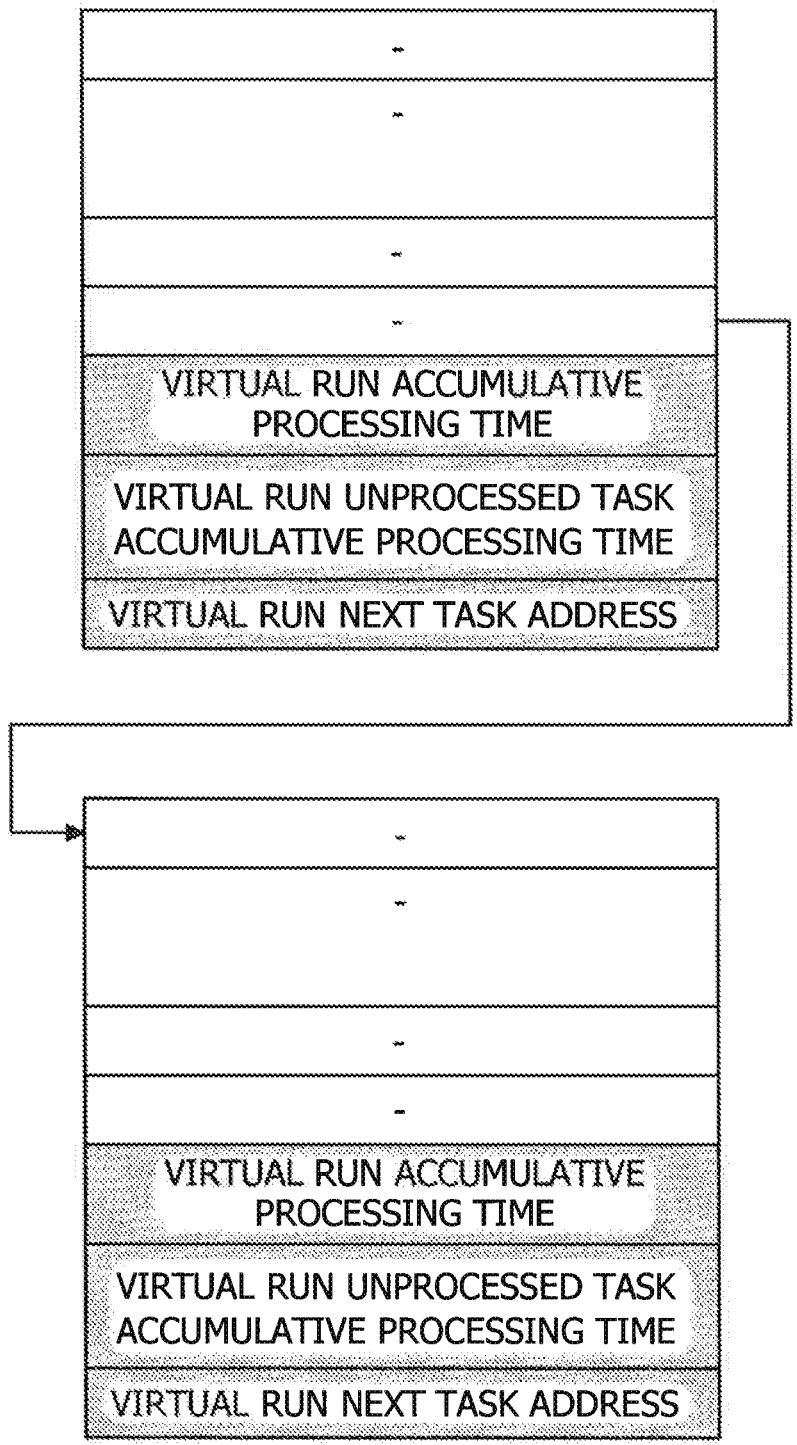
FIG. 12 is a diagram illustrating management information of a device task queue joined by a virtual run NEXT task address.

FIG. 12 illustrates the management information of the device task queue connected by the virtual run NEXT task address. The management information of each device task queue can be connected by setting the next job task address in a virtual run NEXT task processing unit address on the device-by-device basis.

Note that the virtual run unit 23, when virtually running the tasks of the job task on the performance prediction target computer, generates the unprocessed task for indicating that the device is disabled from executing due to an elapse of time. The unprocessed task is a task allocated for the convenience's sake of the process of the virtual run unit 23 during a period of its being disabled from allocating the individual tasks contained in the job task to the devices (CPU, DISK). The device allocated with the unprocessed task implies an elapse of time while the device remains in an idle status for the period of the unprocessed task. Namely, the unprocessed task indicates a period of time between one task and the next task in the device task queue.

Figure 13:
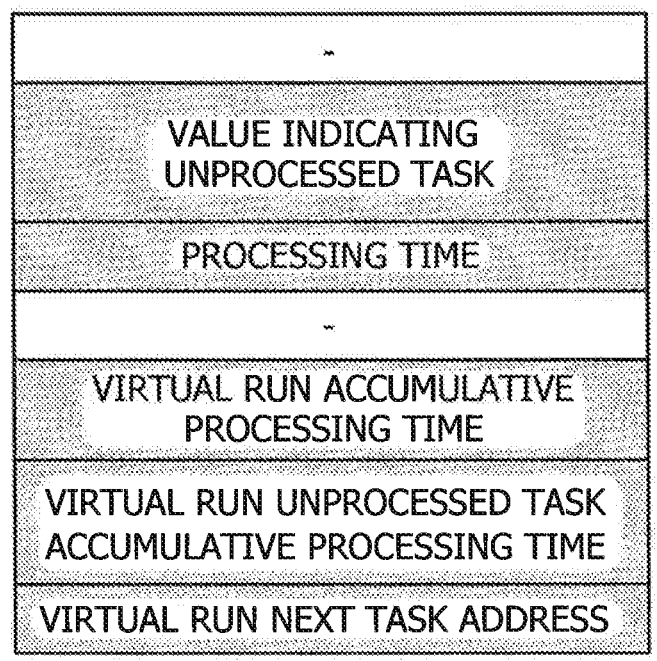
FIG. 13 is a diagram illustrating management information of an unprocessed task.

FIG. 13 illustrates the management information of the unprocessed task. The virtual run unit 23 accumulates also the unprocessed task in the virtual run accumulative processing time. The virtual run unit 23 is thereby enabled to determine a period of time for which each device is occupied by the task and the idle time and to calculate, e.g., the usage ratio etc. of the device. For example, in the device task queue, the virtual run unit 23 can determine the usage ratio of the relevant device when finishing the virtual run by accumulating a length of time as much as the unprocessed tasks of each device as the "virtual run unpressed task accumulative processing time".

Device Usage Ratio=1−("Virtual Run Unprocessed Task Accumulative Processing Time" of Device Final Task/"Virtual Run Accumulative Time" of Device Final Task) [Mathematical Expression 1]

The device usage ratio being known, it is feasible to examine influence on the computer system due to an addition of the job and load sharing of the device.

Further, when virtually running the tasks, a process allocation method may also be incorporated, which is based on a priority level of the execution by the actual OS. The performance can be predicted further accurately by incorporating the process allocation method based on the priority level of the execution. It may be sufficient that, e.g., if a job A is higher in execution priority level than the job B, an allocation sequence is given to the job A three times and thereafter given to the job B once, thus incorporating the same allocation method into the virtual run unit 23 as the method of allocating the device to each of the task by the OS.

Figure 8:
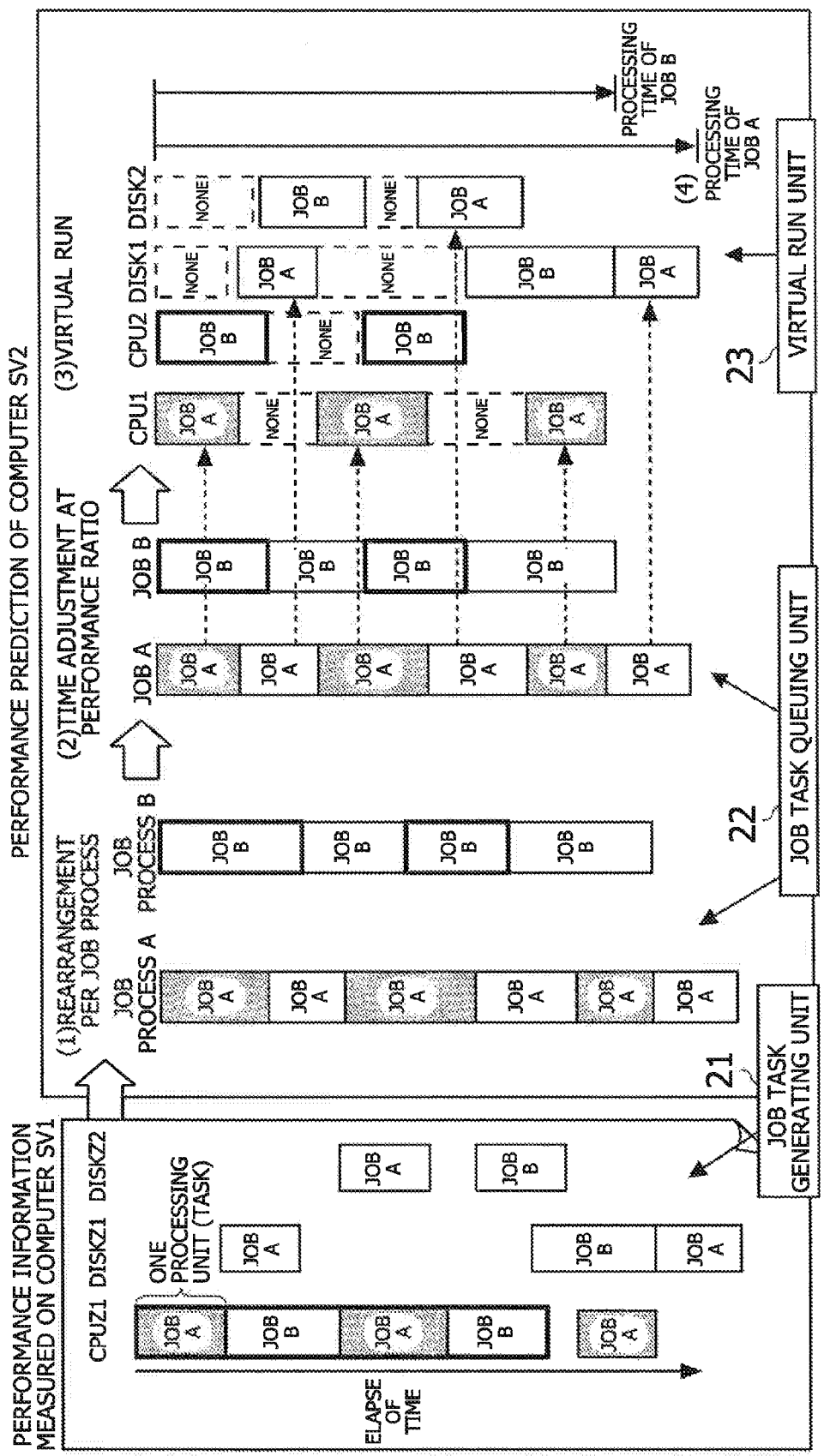
FIG. 8 is a diagram illustrating processes ranging from generation of a job task up to a virtual run.

FIG. 8 illustrates the processes ranging from the generation of the job task up to the virtual run. In an example of FIG. 8, the performance is predicted based on the performance information measured on an active computer SV1, the performance being given when a performance prediction target computer SV2 executes the job program.

In the example of FIG. 8, the computer SV1 includes single CPU Z1 and two DISKs Z1, Z2. Further, the computer SV2 includes two CPUs 1, 2 and two DISKs 1, 2.

In the computer SV1, the performance information is measured by executing the job program A and the job program B. In FIG. 8, one processing unit, i.e., the management information of the task when the computer SV1 or SV2 etc. executes the job program A, the job program B etc. is indicated by a character string such as the job A or the job B. Further, the respective tasks specified by the job A and the job B are sequentially arranged per job process A and per job process B in an arrow direction indicating the elapse of time. Chains of tasks arranged in the execution sequence per job process A and per job process B are called job task queues.

The job task queuing unit 22 converts the processing time of the job task queue on the basis of the relative ability value of the device of the computer SV1 and the relative ability value of the device of the computer SV2. Then, the respective tasks of the job task queue, of which the processing time is converted, are inputted in the execution sequence into the respective devices CPU 1, CPU 2, DISK 1, DISK 2) of the performance prediction target computer SV2, and are made to virtually run by use of the devices. The virtual run implies that each task occupies the device just for the processing time of the task. A segment indicated by "unprocessed" in the virtual run tasks is a running segment of the unprocessed task.

For example, the tasks of the job process A, when allocated to the CPU 1, does not be allocated to other devices (CPU 2, DISK 1, DISK 2). Further, the tasks of the job process B does not be allocated to the CPU 1 in a status of allocating the tasks of the job process A to the CPU 1, but can be allocated to the CPU 2. In the example of FIG. 8, jobs other than the job processes A, B are not implemented. Accordingly, in this status, there are none of tasks to be allocated to the DISK 1, the DISK 2. In the Example 1, the information processing apparatus 10 allocates the unprocessed tasks to the devices with none of the tasks being allocated. As in FIG. 8, the processing time of the unprocessed task extends up to an end point of the already allocated task with the processing being finished fastest.

Then, when the CPU 1 completes processing the tasks of the job process A, the tasks of the job process A can be allocated to the DISK 1. Moreover, when the CPU 2 completes processing the tasks of the job process B, the tasks of the job process B can be allocated to the DISK 2.

Note that the tasks of the job process A are allocated mainly to the CPU 1, while the tasks of the job process B are allocated mainly to the CPU 2 in FIG. 8, however, it does not mean that restrictions exist between the job processes A, B and the devices (CPU 1, CPU 2). Namely, it may be sufficient that the virtual run unit 23 properly selects an idle device of the computer SV2 and gets the tasks to virtually run on the selected device. If the tasks of the job processes A, B etc. occupy the DISKs, however, it happens as the case may be that the idle device of the computer SV2 does not be properly selected. This is because the DISK for storing user data is fixed to, e.g., any one of the DISK 1, the DISK 2, etc. as the case may be. If the device used by the task is fixed onto the computer executing the task, this purport is specified in the task management information.

Figure 9:
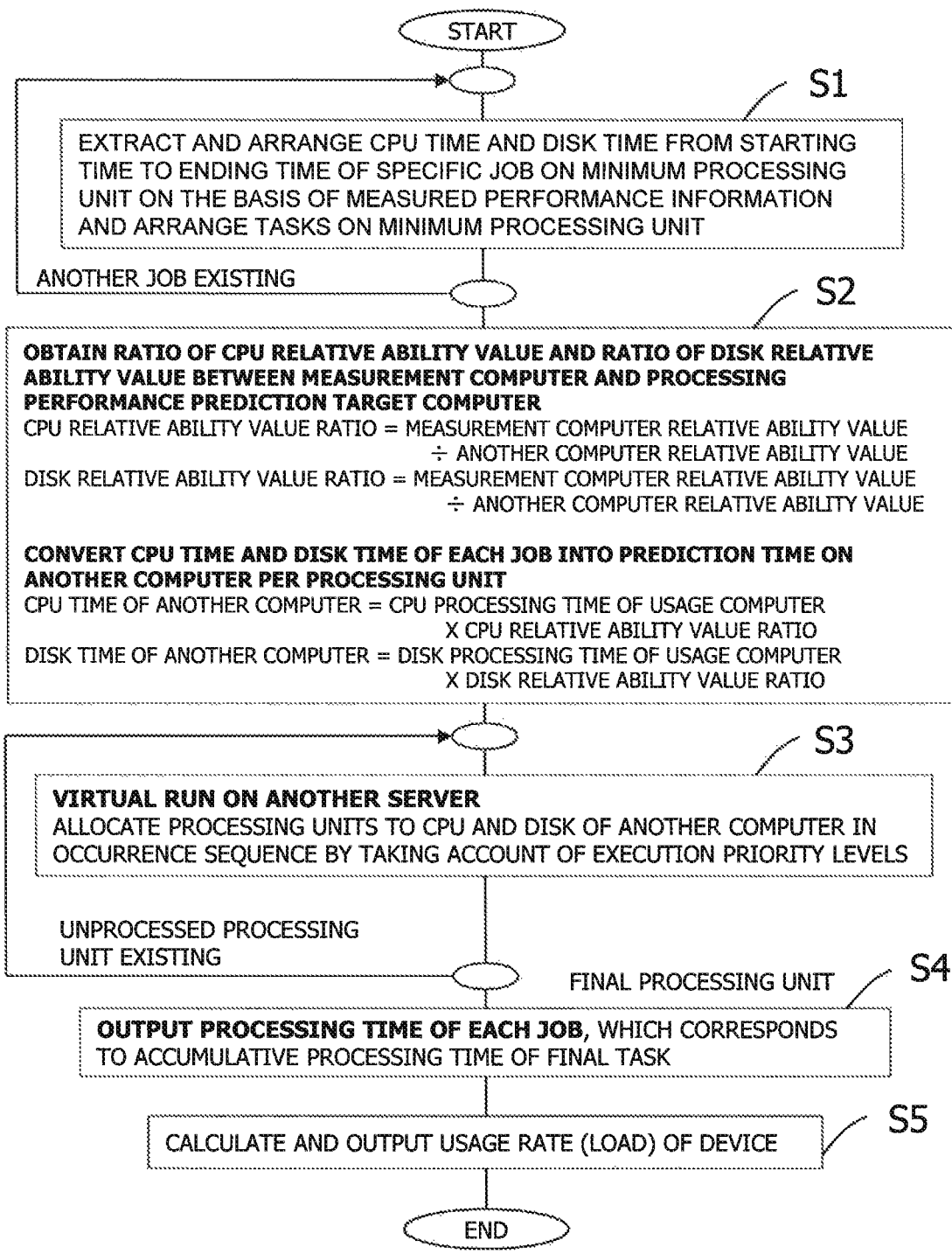
FIG. 9 is a flowchart illustrating a processing flow starting with generation of a job task queue and ending with the virtual run, which are executed by the information processing apparatus.

FIG. 9 illustrates a processing flow starting with the generation of the job task queue and ending with the virtual run, which are executed by the information processing apparatus 10. In the following processes, the computer SV1 measures the performance information, thereby obtaining the predictive value of the processing performance of the computer SV2. As in FIG. 9, the CPU 11 of the information processing apparatus 10 extracts the CPU time and the DISK time from starting time of each job down to ending time thereof on the basis of the measured performance information, then generates the sets of the management information per processing unit, and arranges the sets of management information in the execution sequence (S1). Note that the CPU 11 functioning as the job task generation unit 21 and the job task queuing unit 22 executes the computer program on the main storage device 12 in the process of S1.

In the Example 1, as described in FIGS. 7 and 10, the sets of management information of the tasks are connected in the execution sequence by setting the head address of the management information of the task executed next in the NEXT task address of the management information of the task executed earlier in terms of the elapse of time, thus generating the job task queue for the job processes executed by one job program.

Next, the CPU 11 obtains a ratio between the CPU relative ability values and a ratio between the DISK relative ability values of the computer SV1 and the computer SV2 (S2).

> Ratio between CPU Relative Ability Value=CPU Relative Ability Value of Computer SV1/CPU Relative Ability Value of Computer SV2;
>
> Ratio between DISK Relative Ability Value=DISK Relative Ability Value of Computer SV1/DISK Relative Ability Value of Computer SV2.

Next, the CPU 11 converts the CPU time and the DISK time of each job process into the predictive time in the computer SV2 per processing unit, i.e., per task (S2).

> CPU Time of Computer SV2=CPU Time of Computer SV1×CPU Ability Relative Ratio;
>
> DISK Time of Computer SV2=DISK Time of Computer SV1×DISK Ability Relative Ratio.

Then, the CPU 11 sets again the conversion results given above into the periods of processing time of the tasks in the job task queue. Note that the CPU 11 functioning as the job task queuing unit 22 executes the computer program on the main storage device 12 in the process of S2.

Furthermore, in the computers SV1, SV2, etc., overhead time of the system occurs to some extent when the CPU allocated to the task is switched over. A length of time taking account of the overhead time caused concurrently with the switchover of the CPU can be added when setting the processing time in S2. For instance, in the case of measuring an average value of the overhead time on the computer SV1 and the computer SV2, it may be sufficient that a differential value between the periods of overhead time is added to each task. The overhead time caused by a switchover of the DISK and paging time for deploying the program on the memory can be also reflected when setting the processing time.

Next, the CPU 11 virtually runs the job task queue in a device queue assuming the computer SV2 (S3). Herein, the "virtual run" connotes that the tasks defined as the processing units are sequentially allocated to the devices (CPU, DISK) of the computer SV2 in the execution sequence of the tasks when executing the job program on the computer SV2. More specifically, in the virtual run, the CPU 11 of the information processing apparatus 10 carries out a simulation to input the tasks into the devices of the computer SV2 in the sequence of the job task queue on the basis of task predictive processing time set in the process of S2. Namely, the CPU 11 allocates the tasks of the job task queue to the devices (each CPU and each DISK) of the computer SV2 in the sequence of occurrence of the tasks from the job task queue.

In the case of virtually running the job task queues of the plurality of job processes A, B, etc., it may be sufficient that the tasks are allocated to the task allocation target devices in the same procedure as the procedure of handling the priority levels of the OS of the computer SV2 in accordance with the execution priority levels of the job processes A, B, etc. It may be sufficient that allocation counts of allocating the individual tasks contained in the job task queues of the job processes A, B, etc. to the devices are controlled in accordance with, for example, values of execution priority levels Q1, Q2 specified in the individual job task chains. Note that the task chain of the job task queue is a task chain which the processes of the job program to fulfill the job process are depicted in the form of and may be construed as what the job process is expressed in terms of a resource management process on the computer. Such being the case, the job task queues of the job processes A, B, etc. will hereinafter be simply called job task queues A, B, etc.

Hereat, the sets of management information indicating execution statuses of the tasks on the respective devices are concatenated not in the task sequence (in the sequence of the links of the NEXT task addresses) of the job task queue but by the virtual run NEXT task addresses on the device-by-device basis. Further, if the idle time of the device occurs between one task and the next task, the unprocessed task is inserted in and joined between these tasks. This is because it is predicted that the task execution sequence will vary depending on the predictive processing time of each task on the computer SV2 and on the configurations of the devices (CPU, DISK) of the computer SV2.

Then, the CPU 11 allocates the tasks to the devices and performs accumulative calculations of the periods of converted processing time set in the respective tasks, the calculated processing time being registered in "virtual run accumulative processing time" fields (see FIG. 10) while linking up the sets of management information by the virtual run NEXT task addresses. Note that the CPU 11 functioning as the virtual run unit 23 executes the computer program on the main storage device 12 in the process of S3.

Subsequently, upon finishing allocating all the job task queues, the CPU 11 outputs the processing time of each job that is acquired by the virtual run (S4). The sets of management information of the tasks are concatenated on the device-by-device basis by the virtual run NEXT task addresses, thereby generating the device task queue. Accordingly, the sets of management information of the tasks of the job task queue based on the performance information measured on the computer SV1 are concatenated on the device-by-device basis. For example, it follows that the tasks contained in the job task queue of the job process A are concatenated to the queue per device. However, the processing time of the job process A is indicated by the virtual run accumulative processing time, which is recorded in the task of the job process A, the task concatenated to a tail of the device task queue, namely, recorded in the management information of the task with the ending time being the latest. Then, the CPU 11 of the information processing apparatus 10 outputs the virtual run accumulative processing time as the processing time of the job processes A, B, etc. on the computer SV2, the virtual run accumulative processing time being recorded in the tail of the device task queue linked by the virtual run NEXT task address in the management information with respect to the job processes A, B, etc., i.e., recorded in the management information exhibiting the latest ending time.

On the other hand, the virtual run accumulative processing time in the management information of the task connected to the tail of each of the device task queues represents the processing time of the device concerned. Further, the virtual run unprocessed task accumulative processing time in the management information of the task connected to the tail of each of the device task queues represents a total of periods of idle time of the device concerned. Accordingly, the CPU 11 calculates the usage ratio (load) of each device according to the [Mathematical Expression 1] given above, and outputs the calculated usage ratio (S5).

Note that the CPU 11 functioning as means to estimate execution time executes the computer program on the main storage device 12 in the process of S4.

<Effect of Example 1>

As discussed above, the information processing apparatus 10 generates the job task queue by chaining the tasks defined as the processing units when executing the job programs A, B, etc. on the basis of the performance information measured on the computer SV1. Then, the information processing apparatus 10 converts the processing time of each of the tasks of the job task queue on the basis of the ratio between the relative ability value of the computer SV1 and the relative ability value of another computer, e.g., the performance prediction target computer SV2. Subsequently, the information processing apparatus 10 sequentially inputs the tasks in the task execution sequence of the job task queue into the devices of the computer SV2 according to the configurations of the devices (CPU, DISK, etc.) of the computer SV2, and chains the tasks on the device-by-device basis by the virtual run NEXT task addresses. Moreover, on the occasion of inputting the tasks into the device, the unprocessed task is set in the idle time if the idle time occurs in the device of the computer SV2.

Therefore, the information processing apparatus 10 can realize the virtual run in such a manner that the tasks contained in the job task queue virtually occupy the devices (CPU, DISK, etc.) of the performance prediction target computer SV2 in accordance with the relative ability values of the devices of the computer SV2, depending on the configurations of the devices. Therefore, the information processing apparatus 10 enables the tasks to virtually run on the respective devices while simulating the switchover of the task on the performance prediction target computer SV2. It is therefore feasible to predict highly accurately the execution time involving the switchover process of the task of the performance prediction target computer SV2 from the execution time involving the switchover process of the task of the computer SV1 of which the performance information is measured. Namely, the execution waiting time etc., which is generated from the relationship between the device configuration and the job task queue, can be reproduced under that same condition as on the actual computer SV2.

Moreover, the information processing apparatus 10 can predict the execution time or the performance of the performance prediction target computer SV2 by further improving the accuracy in a way that reflects the execution priority levels of the respective job task queues on the occasion of allocating the tasks of the job task queues to the devices.

Moreover, the information processing apparatus 10 connects the sets of management information of the tasks on a resource-by-resource basis, i.e., the device-by-device basis of the performance prediction target computer SV2 by the virtual run NEXT task addresses in the virtual run. The process described above enables the usage time of the device to be calculated based on the virtual run accumulative processing time of the management information located at the tail of the device task queue generated per device.

Still further, the information processing apparatus 10 can calculate the usage ratio (load) of each device by allocating the unprocessed task in the time for which none of the tasks is allocated to each device. Namely, the information processing apparatus 10 can obtain the non-usage time per resource, i.e., per device as the virtual run unprocessed task accumulative processing time by adding up the periods of time of the unprocessed tasks in the device task queue generated on the device-by-device basis in the virtual run.

Example 2

A processing example according to a second working example (Example 2) of the information processing apparatus 10 will hereinafter be described with reference to the drawings in FIGS. 14 through 22. In the Example 2, the configuration of the information processing apparatus 10 is the same as in the Example 1. This being the case, a description of the configuration of the information processing apparatus 10 is omitted. The example 2 will discuss the processing example of the information processing apparatus 10 by further materializing conditions as a premise for predicting the performance of the job process.

<Premise>

The computer SV1, of which the processing performance is measured, can be used to include one CPU and two DISKs. The computer SV2, of which the processing performance is predicted, can be used to include two CPUs and two DISKs. The number of the usable devices in the Example 2 is the same as in the case of the Example 1.

In the Example 2, however, it is assumed that the ability (relative ability value) of the single CPU of the computer SV2 is twice as high as that of the computer SV1. Moreover, the ability (relative ability value) of the DISK of the computer SV1 is to be the same as that of the computer SV2. The information processing apparatus 10 predicts the processing time of the job process on the computer SV2 on the premise described above in the example 2.

The tasks are depicted by rectangular blocks in FIGS. 14-20. Within the tasks, the symbols A, B represent job process names. Furthermore, the computer SV1 is to include a CPU Z1, a DISK Z1 and a DISK Z2. Moreover, the computer SV2 is to include a CPU 1, a CPU 2, a DISK 1 and a DISK 2. Further, in these drawings throughout, the CPU Z1, the CPU 1, the CPU 2, the DISK Z1, the DISK 22, the DISK 1 and the DISK 2 are abbreviated to CZ1, C1, C2, DZ1, DZ2, D1 and D2.

Additionally, numerals described next to the device names (CZ1, C1, C2, DZ1, DZ2, D1, D2, etc.) after the job process task names (A, B, etc.) in the respective rectangles represent the processing time of the tasks. A unit of time is a relative value but is not construed in any way as limiting the value. The unit of time will hereinafter be called "unit time".

<Processing Example>

Figure 14:
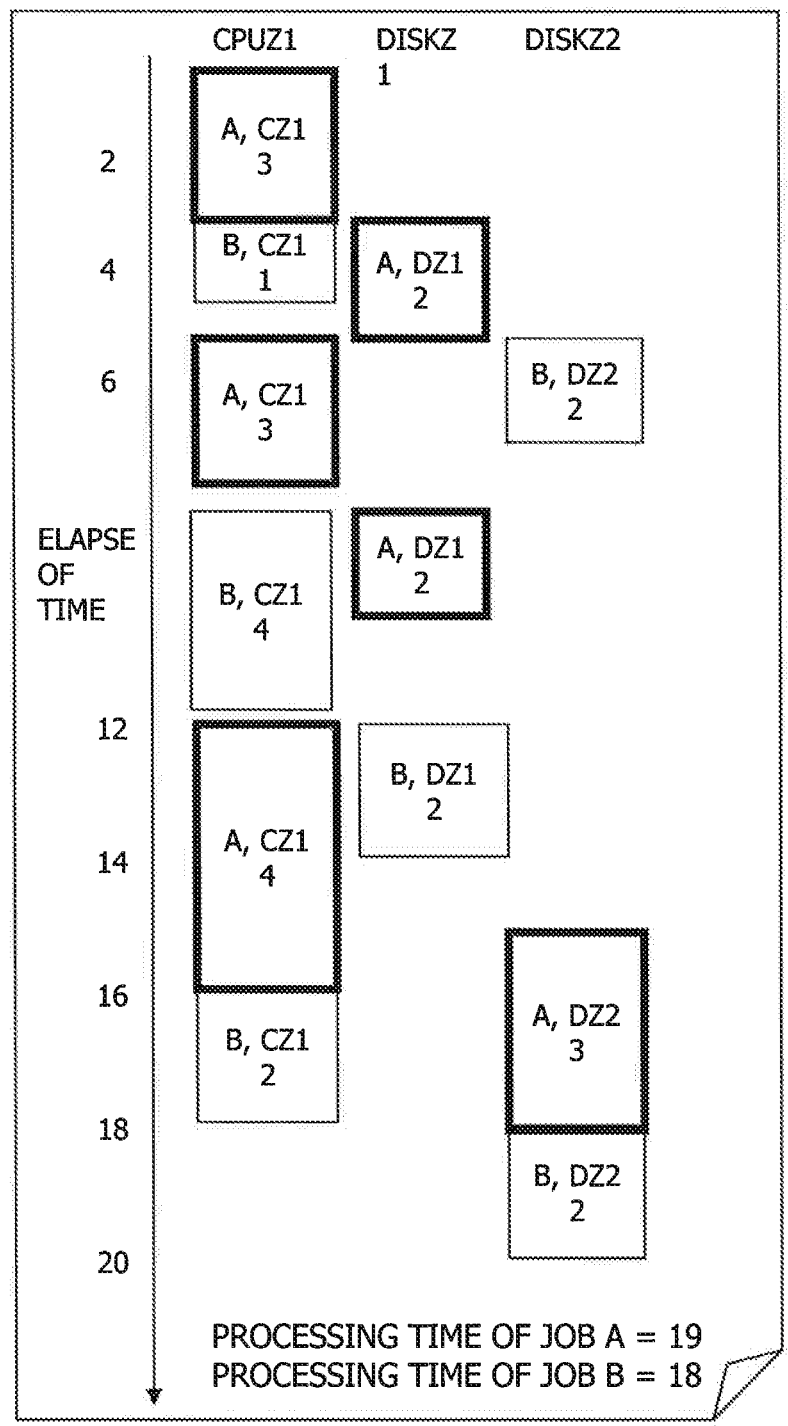
FIG. 14 is a diagram illustrating the performance information measured by a computer in a time sequence.

FIG. 14 depicts pieces of performance information measured on the computer SV1 in a time sequence. In the example of FIG. 14, to begin with, the tasks of the job process A are executed by the CPU Z1 for 3 unit time. Next, the tasks of the job process B are executed by the CPU Z1 for 1 unit time. The job process B therefore starts at a point of an elapse of 3 unit time.

Next, after the CPU 21 has finished the tasks, the tasks of the job process A are executed on the DISK Z1 for the 2 unit time. Furthermore, the tasks of the job process B are executed on the DISK Z2 at 2 unit time.

Moreover, for instance, when the DISK Z1 finishes the second task of the job process A, the job process B occupies the CPU Z1. Accordingly, the third task of the job process A in the CPU Z1 results in waiting till the CPU Z1 finishes the second task of the tasks of the job process B.

With the performance information described above, the processing time of the job process A is added up to 19 unit time counted from 0 to 19 on a time base. Further, the processing time of the job process B is added up to 18 unit time counted from 3 to 21 on the time base.

Figure 15:
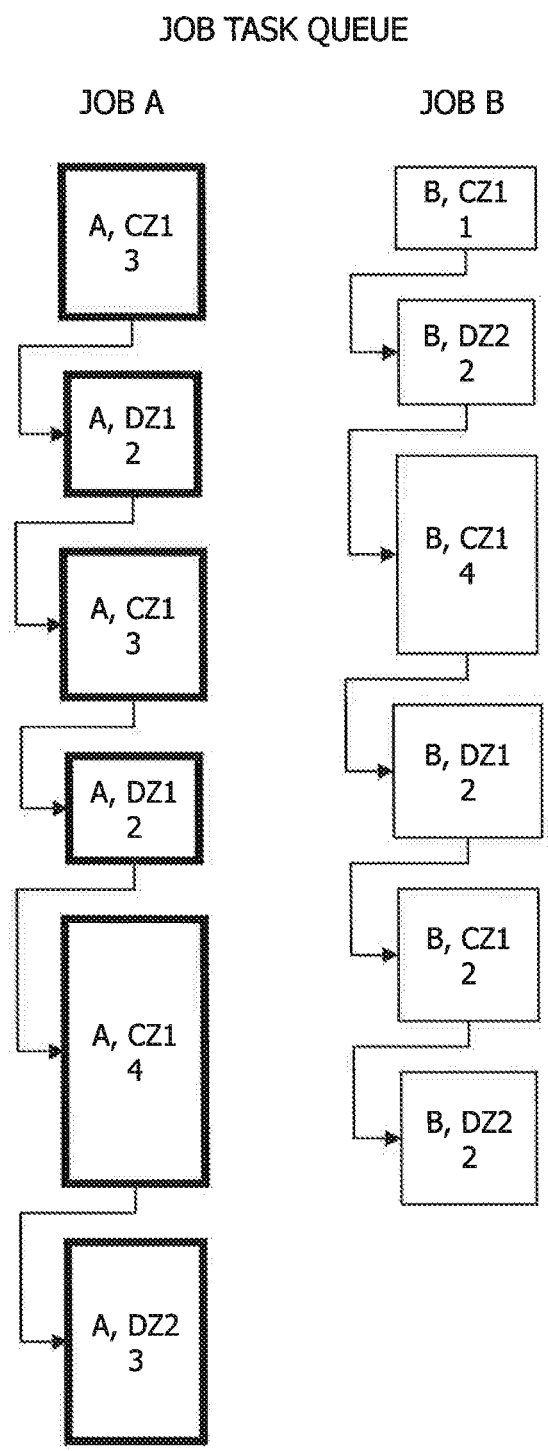
FIG. 15 is a diagram illustrating the job task queue generated based on the performance information in FIG. 14.

FIG. 15 illustrates the job task queue generated based on the performance information in FIG. 14. In the Example 2 also, one processing unit when each computer executes the job program is called the task. The information processing apparatus 10 connects the sets of management information of the tasks by the NEXT task addresses (see FIG. 10), thereby generating the job task queue. Hereat, the information processing apparatus 10 records the job program name, the device name, the processing time and the NEXT task address in the management information of each task.

Next, the information processing apparatus 10 varies the processing time at a ratio of the performance of the computer SV1 to the performance of the computer SV2. The premise in the Example 2 is that the single CPU processing ability is doubled, and hence the information processing apparatus 10 halves a period of the processing time of all the tasks with the CPU being set as the device name of the job task queue.

Figure 16:
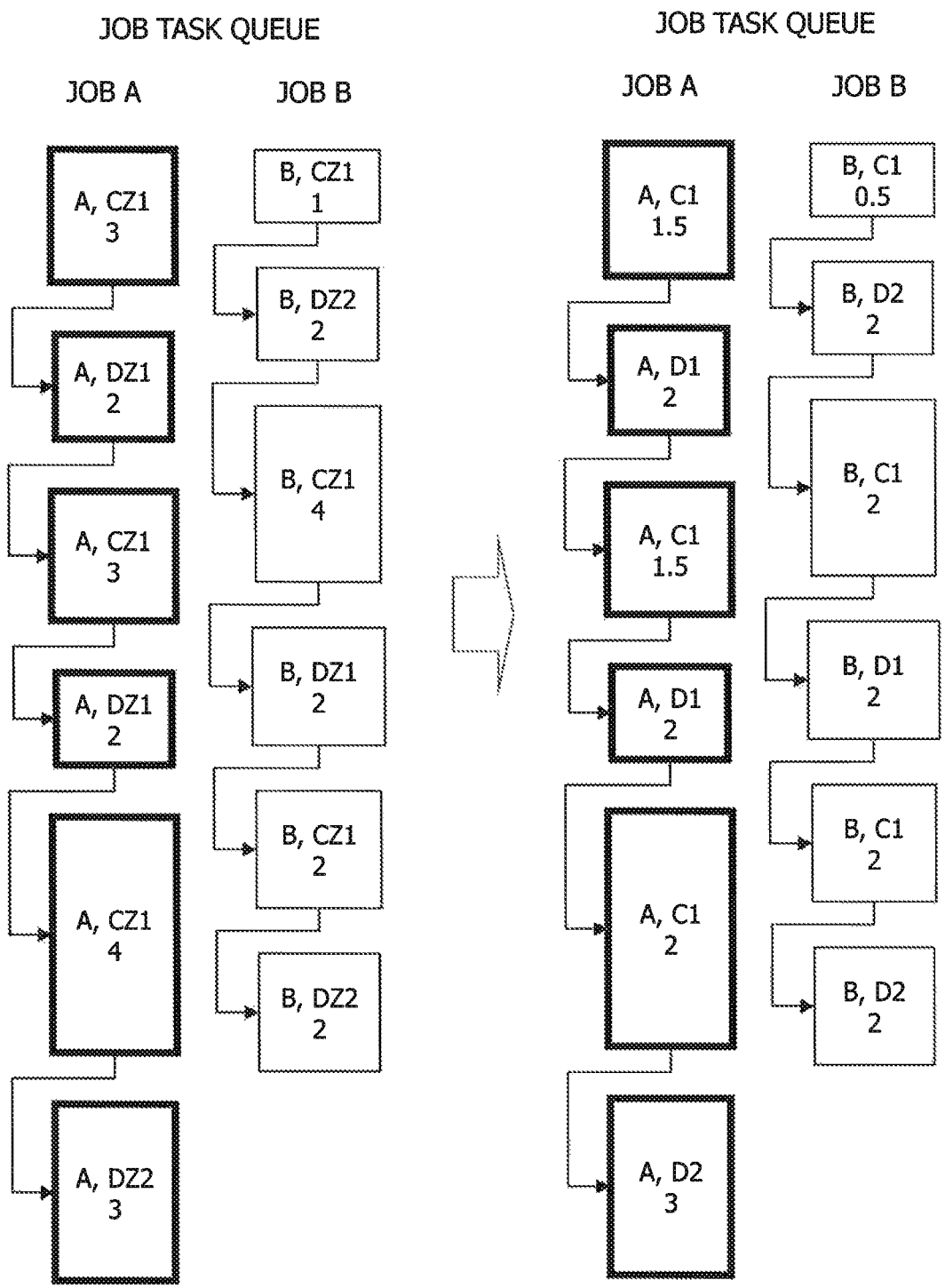
FIG. 16 is a diagram illustrating the job task queues before and after converting the processing time, respectively.

FIG. 16 illustrates the job task queues before and after converting the processing time, respectively. The job task queue with the processing time being converted is illustrated on a right side in FIG. 16. Note that the device names CZ1, DZ1, DZ2 of the computer SV1 are converted into the device names C1, D1, D2 of the computer SV2 in FIG. 16. When the device name among those given above is the CPU, each task may be allocated to whichever CPU of the computer SV2. Hence, the task executed by the CPU Z1 of the computer SV1 may be executed by whichever CPU, the CPU 1 or the CPU 2, of the computer SV2. This is because the job process is not limited to the specific CPU. Note that the resources of the computer are called the devices also in the Example 2.

On the other hand, when the device name is the DISK, the tasks are allocated to the DISKs (D1, D2, etc.) specified in the management information. This is because the data to be output or inputted to or from the DISKs are allocated to the specific DISKs as the case may be. This being the case, it is assumed in the Example 2 that when the device is the DISK, the tasks allocated with and executed on the DISK Z1 and the DISK Z2 of the computer SV1 are allocated with and executed on the DISK 1 and the DISK 2 of the computer SV2.

Subsequently, the information processing apparatus 10 fetches the task from the head of the job task queue. Then, the information processing apparatus 10 allocates the fetched task to the device. The information processing apparatus 10 sequentially reads the sets of management information from the heads of the job task queues per job process such as the job processes A, B, etc., and connects the sets of management information on the device-by-device basis, i.e., on a CPU-by-CPU basis and a DISK-by-DISK basis.

As discussed in the Example 1, the execution priority levels may be set among the job processes A, B, etc., and the devices may be allocated in the sequence of the execution priority levels. Further, if the execution priority levels are not set among the job processes A, B, etc. and when switching over the task, the job process may be selected randomly from within the job processes A, B, etc. Moreover, with respect to the CPUs in the devices allocated with the tasks, the CPU allocated with none of other tasks may be selected. On the other hand, with respect to the DISKs in the devices allocated with the tasks, the DISK specified in the management information of the task is used as it is.

Figure 17:
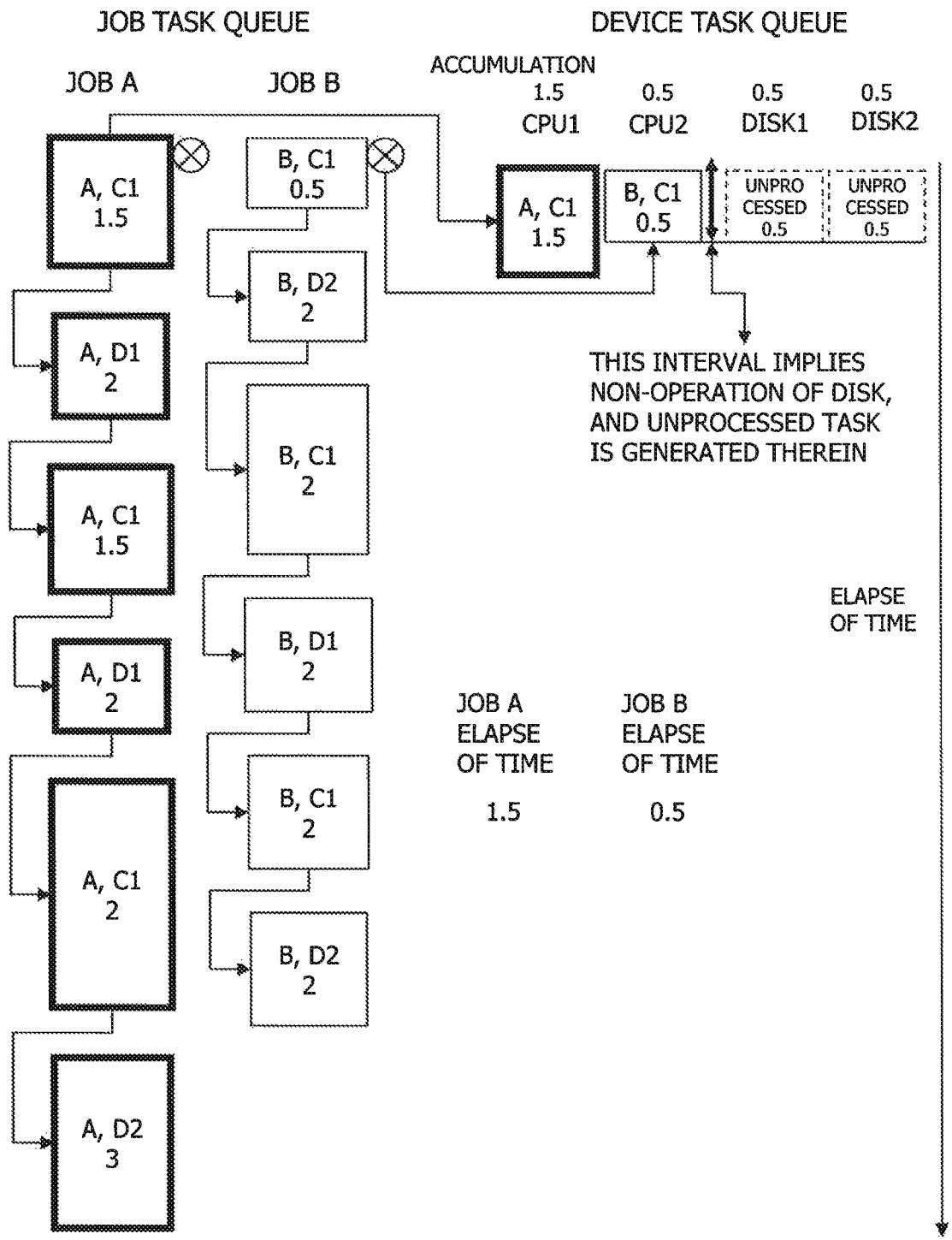
FIG. 17 is a diagram illustrating a process of allocating a task to a device.
Figure 18:
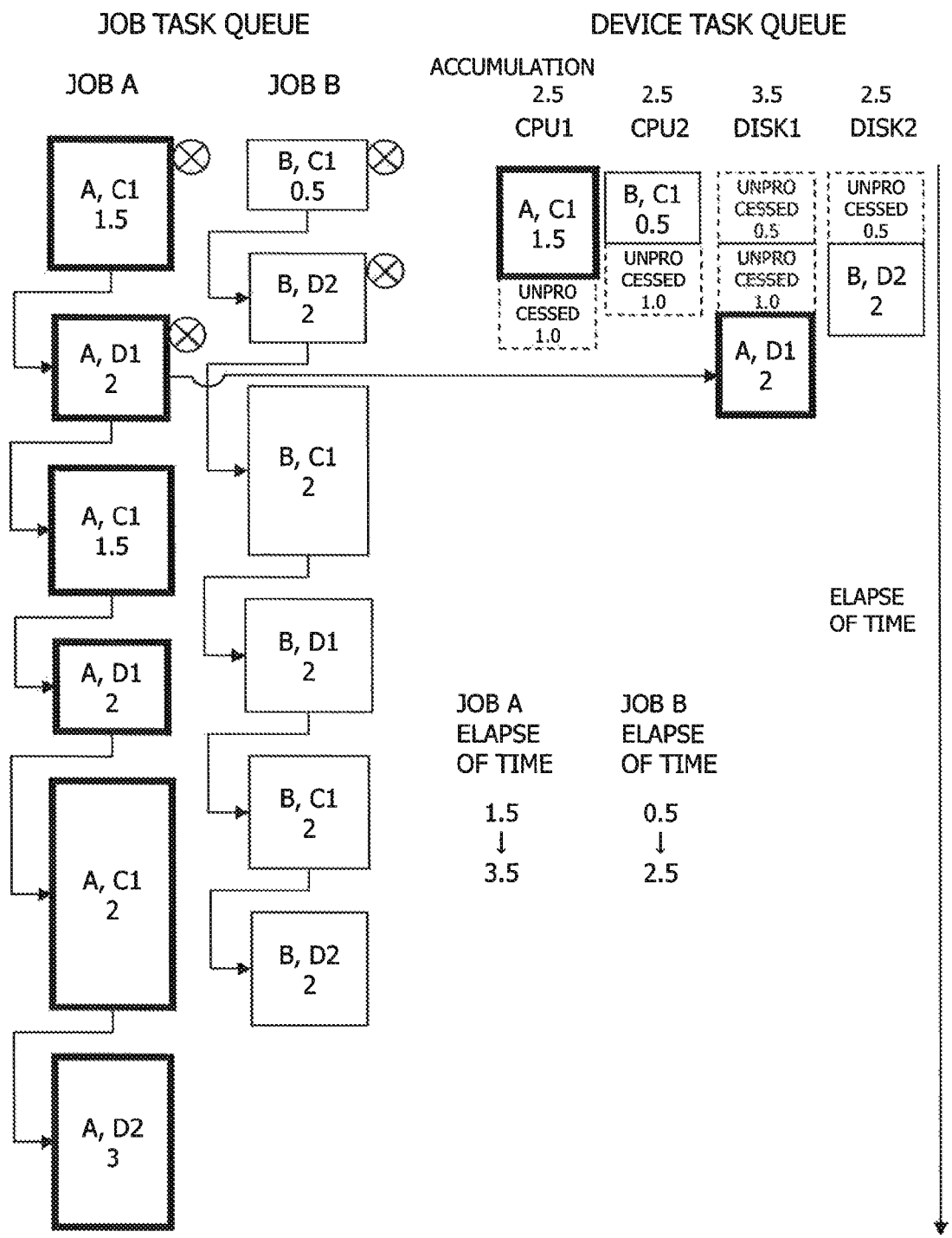
FIG. 18 is a diagram illustrating the process of allocating the task to the device.
Figure 19:
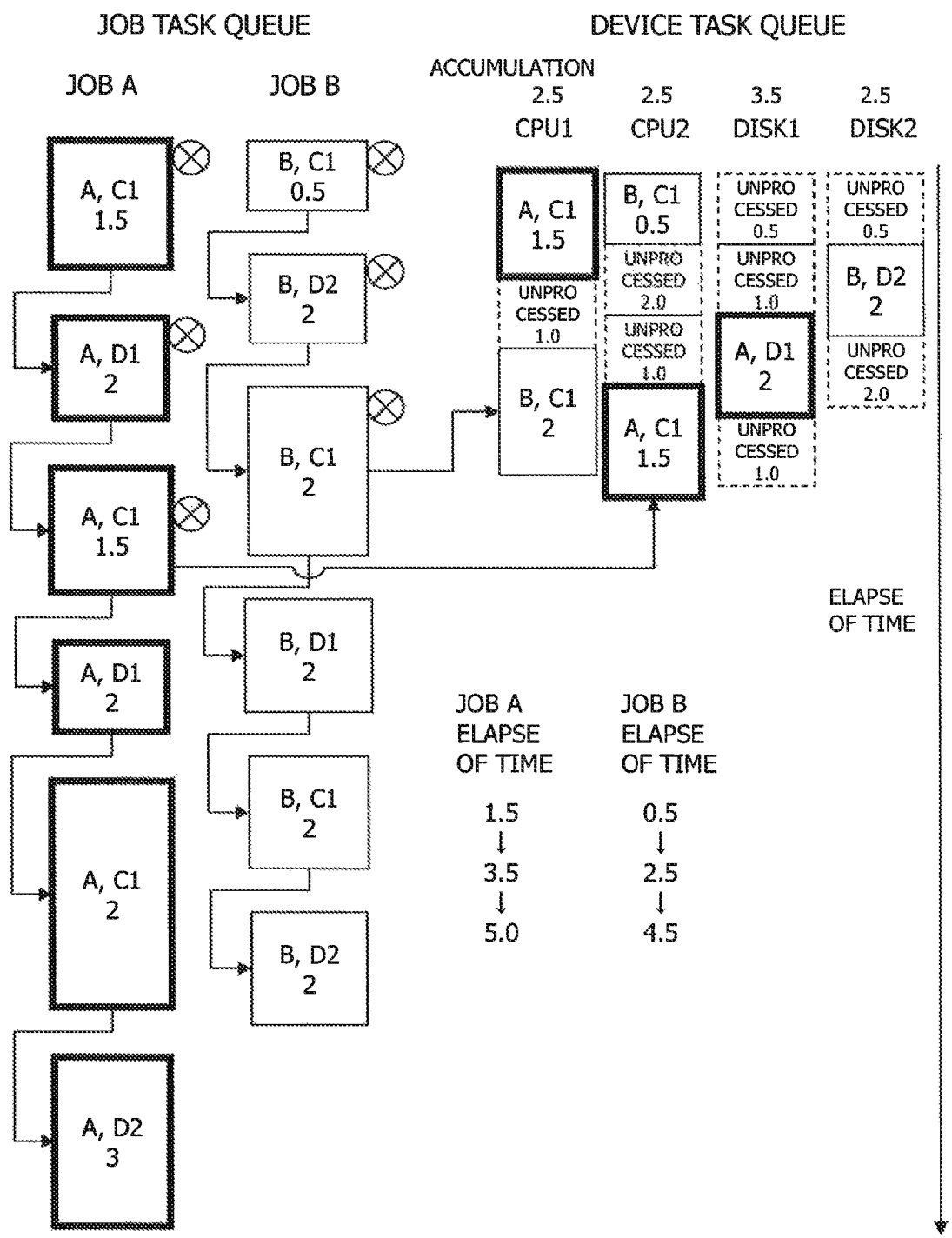
FIG. 19 is a diagram illustrating a result of repeating processes of selecting a job process, reading the task and allocating the task to the device.

FIGS. 17-19 illustrate the processes of allocating the tasks to the devices. In the case of FIG. 17, the task of the job process A is allocated to the CPU 1 for 1.5 unit time, and the task of the job process B is allocated to the CPU 2 for 0.5 time unit. Then, the information processing apparatus 10 adds the allocated time unit to the "virtual run accumulative processing time" in the management information of the allocated task.

As a result of the allocation described above, 1.5 unit time elapses on the time base in the CPU 1 for the job process A. Further, 0.5 unit time elapses in the CPU 2 for the job process B. Hereat, for at least the processing time, i.e., 0.5 unit time of the task of the job process B, the unprocessed tasks are allocated to the DISK 1, the DISK 2 because of the DISK 1, the DISK 2 not being used.

Namely, after allocating all the job task queues executed by the computer SV2 to the devices of the computer SV2, the unprocessed tasks are allocated to the idle devices in the devices of the computer SV2. In the allocation of the unprocessed tasks, the information processing apparatus 10 selects the job process of the task exhibiting the minimum "virtual run accumulative processing time" in the management information within the tasks already allocated to the devices. The task exhibiting the minimum "virtual run accumulative processing time" connotes the task with the virtual run being finished fastest in the tasks kept in the virtual run at the present. For example, in the example of FIG. 17, the "virtual run accumulative processing time" of the task of the job process A is 1.5, while the "virtual run accumulative processing time" of the task of the job process B is 0.5. Thereupon, the job process B is selected. Then, the information processing apparatus 10 allocates the unprocessed tasks to the idle devices till completing the execution of the selected task exhibiting the minimum "virtual run accumulative processing time". Namely, in the example of FIG. 17, the unprocessed tasks are allocated to the DISK 1, the DISK 2 for 0.5 unit time. Through the procedure described above, the tasks read from the job task queues or the unprocessed tasks are allocated to all the devices up to a tail of the execution time of the task exhibiting the minimum "virtual run accumulative processing time". Note that if the number of the job task queues to be executed is larger than the number of the devices and if any idle device does not occur, the unprocessed tasks are not allocated as the case may be.

Next, the information processing apparatus 10 reads the management information of the next task of the selected job process B. It follows that the selected task exhibiting the minimum "virtual run accumulative processing time" is processed in completion for the first time, and the next task is allocated. Then, the information processing apparatus 10 determines whether or not the task can be allocated to the device specified by the readout management information of the next task.

In the example of FIG. 17, the next task of the job process B is the task of the DISK 2, the unprocessed task is allocated to the DISK 2 for 0.5 unit time with respect to "0.5" of the "virtual run accumulative processing time" of the job process B, and the DISK 2 can be allocated with the task. Thereupon, as illustrated in FIG. 18, the information processing apparatus 10 allocates the next task of the job process B to the DISK 2 (see FIG. 18). Then, the "virtual run accumulative processing time" of the job process B becomes 2.5 unit time.

Note that if the task allocated to the DISK 2 occupies the DISK 2 longer than the tail of the execution time (the tail of the unprocessed task of 0.5 unit time) of the task exhibiting the minimum "virtual run accumulative processing time" in FIG. 17, the next task of the job process B does not be allocated to the DISK 2. In this case, it follows that the task of the job task queue B waits till finishing the task located at the tail of the device task queue of the DISK 2.

Incidentally, in such a type of task that the next task is to be allocated to the CPU, the device, i.e., the CPU is not, however, limited. Then, the information processing apparatus 10, if the idle CPU exists just at the time when completing the execution of the task exhibiting the minimum "virtual run accumulative processing time", allocates the task to this idle CPU. Further, whereas if no such an idle CPU exists just at the time when completing the execution of the task exhibiting the minimum "virtual run accumulative processing time", the information processing apparatus 10 allocates the task to the CPU reaching the idle status to a fastest possible degree, i.e., the CPU standing in the shortest waiting time.

As a result of allocating the next task of the job process B to the DISK 2 through the processes in FIG. 17, the "virtual run accumulative processing time" of the job process B becomes 2.5 unit time. Accordingly, the "virtual run accumulative processing time" of the job process A is 1.5 unit time and is shorter than 2.5 unit time of the "virtual run accumulative processing time" of the job process B. Then, the information processing apparatus 10 subsequently reads the management information of the next task of the job process A from the job task queue.

In an example of FIG. 18, at first the idle device receives the allocation of the unprocessed task up to the tail of the execution time of the job process A on the CPU 1, which is the task exhibiting the minimum "virtual run accumulative processing time" similarly to FIG. 17. As a result, the unprocessed tasks for 1 unit time are allocated to the CPU 2 and the DISK 1, respectively.

Moreover, the next task of the job process A is the task of the DISK 1, and the processing time is 2 unit time. Further, when finishing the task of the job process A on the CPU 1, the DISK 1 comes to the idle status (the tail of the unprocessed task). Thereupon, the information processing apparatus 10 allocates the DISK task of the job process A for 2 unit time next to the unprocessed task of the DISK 1. With this allocation, the "virtual run accumulative processing time" in the management information of the task of the job process A becomes 3.5.

Note that the "virtual run accumulative processing time" in the management information of the task of the job process A is 3.5, and the processing time of the DISK 1 is also 3.5 in FIG. 18. Namely, the "virtual run accumulative processing time" in the management information of the task represents the processing time of the device at the present time when finishing the process as well as representing the processing time per job process.

Figure 20:
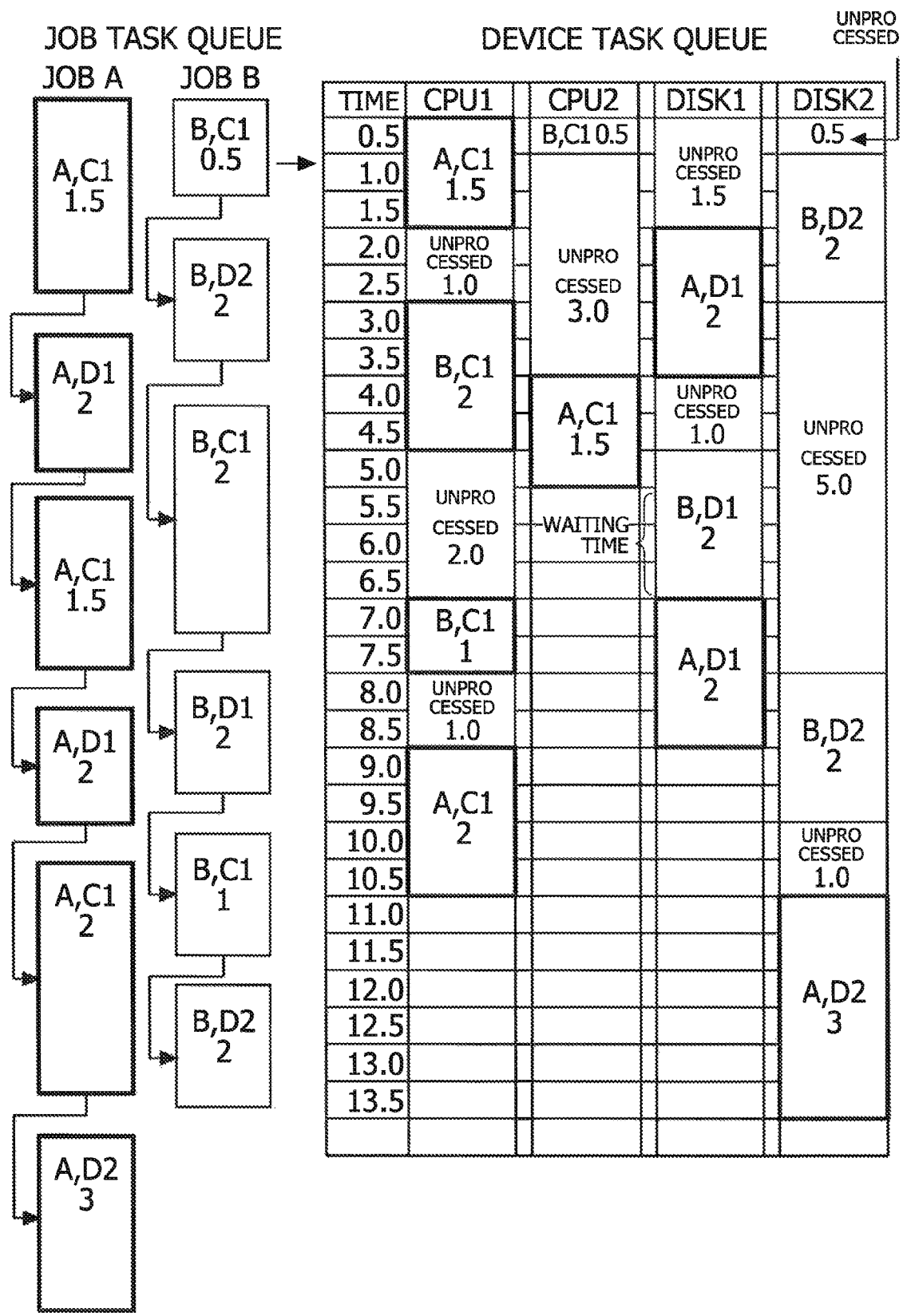
FIG. 20 is a diagram illustrating statuses of allocating the tasks to the devices when performing the virtual run together with the unprocessed tasks on a time base.

FIG. 19 illustrates a result of repeating the processes of selecting the job process, reading the task and allocating the task to the device. Further, FIG. 20 depicts statuses of allocating the tasks to the devices when performing the virtual run together with the unprocessed tasks on the time base. Still further, FIG. 21 illustrates variations of the accumulative values of the periods of processing time of each job process when finishing all the tasks of the job task queue.

As already described, in the job task queue of FIG. 19, the sets of management information of the tasks are connected by the NEXT task addresses for each of the job processes A, B, etc. On the other hand, in the device task queue, the sets of management information of the tasks are connected by the virtual run NEXT task addresses on the device-by-device basis.

In FIG. 20, the axis of ordinate corresponds to the time base indicating elapse time since starting executing the job program. In the Example 2, the elapse time since the predetermined reference time, e.g., when starting executing the job program, is also called the time of day. Moreover, device types are given in fields arranged in a crosswise direction in FIG. 20. Then, the CPU 1, the CPU 2, the DISK 1 and the DISK 2 are given as the device types. The virtually run tasks are given in regions extending along the axis of ordinate in FIG. 20, the regions being segmented by the fields in the crosswise direction.

For example, in the CPU 1, the CPU task of the job process A is executed for 1.5 unit time. The next task of the job process A is the DISK task executed for 2 unit time on the DISK 2. The further next task of the job process A is the CPU task executed for 1.5 unit time on the CPU 2. The still further next task of the job process A is the DISK task executed for 2 unit time on the DISK 1. In the example of the virtual run in FIG. 20, however, the DISK task of the job task B for 2 unit time is not yet completed when executing the second DISK task on the DISK 1, and hence waiting time occurs. The sets of management information of the tasks contained in the same job task as described above are concatenated by the NEXT task addresses. Then, the accumulative processing time of each job task is recorded for each task. This accumulative processing time is given along the axis of ordinate in FIG. 20. Then, for instance, in the job task A, the DISK task for 3 unit time on the DISK 2 is terminated at the time 13.5. FIG. 21 illustrates variations of the accumulative values of the periods of processing time of the job processes A, B, etc. described above.

On the other hand, when putting a focus on each device in FIG. 20, for instance, in the CPU1, the tasks are sequentially arranged such as the CPU task for 1.5 unit time in the job process A, next the unprocessed task for 1.0 unit time and further the CPU task for 2 unit time in the job process B. The chains of these tasks per device are connected by the virtual run NEXT task addresses (see FIG. 12).

As described above, the sets of management information on the task-by-task basis are connected by the NEXT task addresses per job process and connected by the virtual run NEXT task addresses per device. On the other hand, the accumulative processing time in each of the job processes A, B, etc. when performing the virtual run is recorded in the virtual run accumulative processing time of each set of management information (see FIG. 12). By the way, as apparent from the axis of ordinate in FIG. 20, the ending time of each task indicates the ending time of the task per job process and is the processing ending time of the device concerned.

For example, the processing of the CPU 1 is finished at the CPU task for 2 unit time in the job process A, the CPU task being ended at the time 10.5. Similarly, the processing of the DISK 2 is finished at the DISK task for 3 unit time in the job process A, which is ended at the time 13.5. However, with respect to the job process A, the processing is finished at the DISK task for 3 unit time, which is ended at the time 13.5.

Accordingly, the predictive value of the processing time per job can be acquired by reading the virtual run accumulative processing time of the last management information connected by the NEXT task address. On the other hand, the processing time per device can be acquired by reading the virtual run accumulative processing time of the tail management information connected by the virtual run NEXT task address. Moreover, a total of the periods of idle time per device can be acquired by reading the virtual run unprocessed task accumulative processing time of the tail management information connected by the virtual run NEXT task address on the device-by-device basis.

Then, the information processing apparatus 10 outputs the processing time of each job. The "virtual run accumulative processing time" of the finally allocated task is the processing time of the job process.

Further, the information processing apparatus 10 outputs a usage ratio of each device, which is given by the following calculation.

Figure 22:
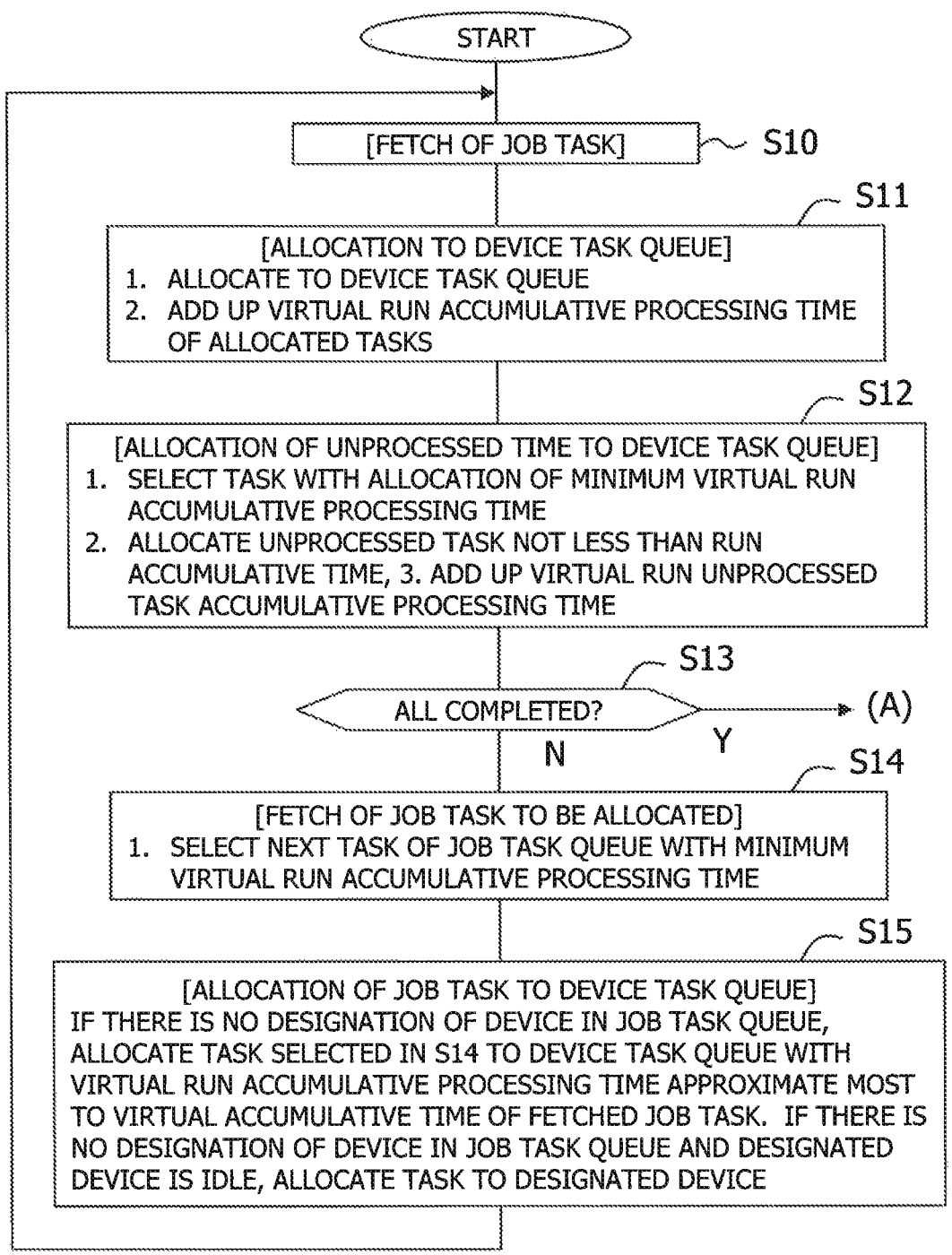
FIG. 22 is a flowchart illustrating processes in which information processing apparatus allocates the job task queue to each device and virtually runs the job task queue.
Figure 23:
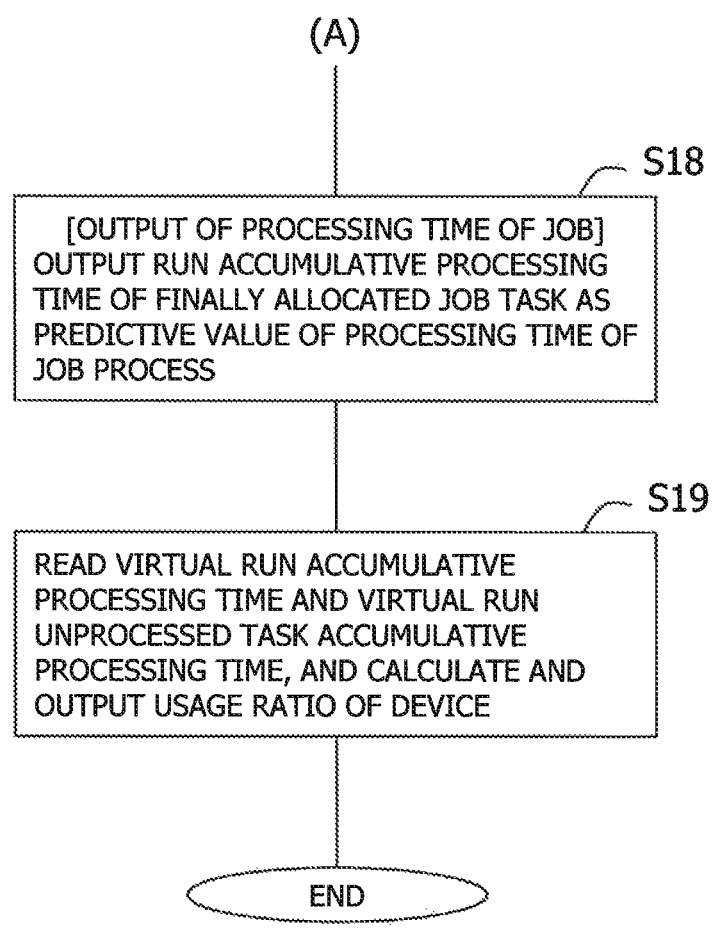
FIG. 23 is a flowchart illustrating the processes in which the information processing apparatus allocates the job task queue to each device and virtually runs the job task queue.

Usage Ratio of Relevant Device=1−("Virtual Run Unprocessed Task Accumulative Processing Time" of Relevant Device Final Task/"Virtual Run Accumulative Processing Time of Relevant Device Final Task);

FIGS. 22 and 23 illustrate processes in which the information processing apparatus 10 allocates the job task queue to each device and gets the tasks of the job task queue to virtually run. The processes in FIGS. 22 and 23 correspond to the processes of the virtual run unit 23 in the Example 1.

In these processes, the information processing apparatus 10, to start with, fetches the task from the job task queue (S10). To be more specific, the information processing apparatus 10 selects the job task queue that virtually runs. If the virtual run target job task queue is a single queue, this job task queue is selected. While on the other hand, in the case of getting a plurality of job task queues to virtually run, the job task queues are selected in a predetermined sequence, e.g., according to the execution priority levels. Alternatively, the job task queues are selected at random. In any case, it may be sufficient that the job task queue is selected in the same procedure as by the control of the OS on the performance prediction target computer SV2. Then, the information processing apparatus 10 reads the management information of the tasks chained as the job task queue from the head of the job task queue in the task execution sequence.

Next, the information processing apparatus 10 allocates the tasks to the devices of the performance prediction target computer in accordance with the task management information read in S10 (S11). The sets of management information of the tasks allocated to the devices are connected by the virtual run NEXT task addresses on the device-by-device basis. Next, the virtual run accumulative processing time of the task allocated to the device and the task processing time are added up.

Subsequently, the information processing apparatus 10 allocates the unprocessed task to the unprocessed time of each device, and connects the management information of the unprocessed task to the device task queue (S12). Namely, the information processing apparatus 10 selects the job task queue exhibiting the minimum virtual run accumulative processing time. Then, the information processing apparatus 10 allocates the unprocessed task so that a length of occupying time of the device task queue, which is so far less than the minimum virtual run accumulative processing time, becomes this minimum virtual run accumulative processing time. Further, the information processing apparatus 10 adds up the virtual run unprocessed task accumulative processing time per device and the processing time of the allocated unprocessed task. Note that the CPU 11 executes the computer program on the main storage device 12 as means to accumulate the non-usage time in the process of S12.

Next, the information processing apparatus 10 determines whether the virtual run of all the tasks of the job task queue is finished or not (S13).

Then, if any unexecuted tasks remain in the job task queue in the virtual run, the information processing apparatus 10 selects the task to be allocated next (S14). Namely, the information processing apparatus 10 reads the management information of the next task in the job task queue, which exhibits the minimum virtual run accumulative processing time.

Then, the information processing apparatus 10 executes the process of allocating the next task to the device task queue in accordance with the readout task management information (S15). Thereafter, the information processing apparatus 10 loops the control back to S11.

In the process of allocating the task to the device task queue in S15, the information processing apparatus 10 determines whether the device is specified in the readout task management information or not. For example, if the task is the CPU task, the device is not specified. On the other hand, if the task is to specify the DISK and if the task is to input/output the user data, the DISK for inputting/outputting the user data is specified in the management information. Further, if the task is to specify the DISK and if the task is to input/output system data, normally the DISK is not specified as the case may be. This is exemplified by a case of inputting/outputting work data to the DISK. Note that the CPU 11 executes the computer program on the main storage device 12 in the processes of S14, S15 as means to record a resource allocation sequence in accordance with task information per resource.

(1) Process in Case of Task with No Designation of Device

With respect to the task with no designation about the device, e.g., with respect to the task allocated to the CPU, the information processing apparatus 10 allocates the task to the idle device if the idle CPU exists. Namely, the information processing apparatus 10 selects such a device task queue that the tail of the virtual run accumulative processing time of the task selected in S14 is coincident with a tail of the device occupying time. The device task queue, in which the tail of the virtual run accumulative processing time is coincident with the tail of the device occupying time, can be exemplified by the device task queue of the CPU 2 when allocating the second CPU task in the job process A in FIG. 19. The device task queue can be further exemplified by the device task queue of the CPU 1 when allocating the second CPU task in the job process B in FIG. 19. Namely, this is the device task queue with the unprocessed task being allocated in the case where the tail of the virtual run accumulative processing time of the task is coincident with the tail of the unprocessed task when allocating the task.

Moreover, if there is no idle device (CPU etc.), the information processing apparatus 10 allocates the task to the device (CPU etc.) reaching the idle status to the fastest possible degree. Namely, the information processing apparatus 10 selects the device task queue with the occupying time being finished fastest from the tail of the virtual run accumulative processing time of the task fetched in S14. Accordingly, the waiting time extends to the end of the occupying time from the tail of the virtual run accumulative processing time of the task fetched in S14.

(2) Process in Case of Task with Designation of Device

While on the other hand, in such a case that the device (DISK etc.) allocated to the task is designated, the information processing apparatus 10 determines whether the designated device in the idle status or not. The device "being in the idle status" implies the device of such a device task queue that the tail of the virtual run accumulative processing time of the task fetched in S14 is coincident with the tail of the device occupying time. Note that the unprocessed task is allocated in the process of S12 to the device coming to the idle status up to the time given at the tail of the virtual run accumulative processing time of the task fetched in S14. Therefore, in the process of S15, the idle device normally becomes the device with the unprocessed task being finished at the tail of the virtual run accumulative processing time of the task fetched in S14. When the designated device is in the idle status, the task is allocated to the designated device.

Whereas when the designated device is not in the idle status, the task is allocated to the tail of the device task queue of the designated device. As a result, the waiting time occurs in the task selected in S14 till the time given at the tail of the device task queue of the designated device.

Further, if it is determined in S13 that none of unexecuted task remains in the job task queue in the virtual run, the information processing apparatus 10 acquires the virtual run accumulative processing time per job task queue from the management information corresponding to the tail of each job task queue, and outputs this virtual run accumulative processing time as a predictive value of the processing time of each job process (S18 in FIG. 23). The CPU 11 functions as means to estimate execution time executes the computer program on the main storage device 12 in the process of S18.

Furthermore, the information processing apparatus 10 reads the virtual run accumulative processing time and the virtual run unprocessed task accumulative processing time per device from the management information of the task at the tail of each device task queue, calculates the usage ratio of each device, and outputs the calculated usage ratio (S19). The CPU 11 functioning as means to calculate a usage ratio per resource executes the computer program on the main storage device 12 in the process of S19.

<Effect of Example 2>

As discussed above, according to the Example 2, the information processing apparatus 10 converts the relative ability values of the devices between the computer SV1 of which the performance information is measured and the performance prediction target computer SV2, and is thereby enabled to predict the performance of the job process and the processing time on the performance prediction target computer SV2.

Note that the Example 2 assumes the computer SV1 configured to include one CPU 1 and the two DISKs and the computer SV2 configured to include the two CPUs and the two DISKs, in which the CPU ability value of the computer SV2 is twice as high as the CPU ability value of the computer SV1. Without being limited to the configuration described above, however, the same performance prediction as in the Example 2 can be attained even in a case of there being different variations in the number of the resources and the ability values of the individual resources between the computer SV1 of which the performance information is measured and the performance prediction target computer SV2. The reason why is that the information processing apparatus 10 allocates the tasks to the resources of the performance prediction target computer SV2 on the basis of the task structures on the computer SV1 with the performance information being measured, and virtually runs the tasks. That is also because the processes on the computer SV2 are simulated through such processing at the high accuracy, and the predictive value of the performance becomes approximate to the processing performance on the actual computer SV2.

According to the information processing apparatus, it is feasible to improve the prediction accuracy when predicting the processing performance on another computer on the basis of the measurement information of the processing performance on one computer.

Non-Transitory Computer-Readable Recording Medium>

A program for making a computer, other machines and devices (which will hereinafter be referred to as the computer etc.) realize any one of the functions can be recorded on a non-transitory recording medium readable by the computer etc. Then, the computer etc. is made to read and execute the program on this recording medium, whereby the function thereof can be provided.

Herein, the recording medium readable by the computer etc. connotes a recording medium capable of accumulating information such as data and programs electrically, magnetically, optically, mechanically or by chemical action, which can be read by the computer etc. Among these recording mediums, for example, a flexible disc, a magneto-optic disc, a CD-ROM, a CD-R/W, a DVD, a Blu-ray disc, a DAT, an 8 mm tape, a memory card such as a flash memory, etc. are given as those removable from the computer. Further, a hard disc, a ROM (Read-Only Memory), etc. are given as the recording mediums fixed within the computer etc.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing method comprising:
   acquiring, by a processor, when a first information processing apparatus executes a plurality of information processes, sets of execution information of the respective information processes, the execution information recorded as task information being structured to contain the resources used in the respective information processes and usage time of the resources in a sequence of switching over with each switchover of the resource used in the information process;
   converting, by the processor, the usage time in each set of execution information into usage time on a second information processing apparatus in accordance with ability value information of the resources of the first information processing apparatus and ability value information of the resources of the second information processing apparatus;
   executing, by the processor, with respect to the plurality of executed information processes, a resource allocation process based on the sets of execution information corresponding to the plurality of information processes, the resource allocation process being allocating the resource of the second information processing apparatus that corresponds to the resource of the first information processing apparatus to a first information process during the converted usage time in the resource switchover sequence in accordance with the task information recorded in the execution information corresponding to the first information process, allocating the resource of the second information processing apparatus to a second information process for idle time not allocated to the first information process during the converted usage time in the resource switchover sequence in accordance with the task information recorded in the execution information corresponding to the second information process, and accumulating periods of virtual run time of the allocated resources; and
   estimating, by the processor, execution time when executing the plurality of information processes on the second information processing apparatus on the basis of an accumulative value obtained by accumulating the virtual run time of the allocated resources up to tail task information contained in the respective sets of execution information corresponding to the plurality of information processes.

2. The information processing method according to claim 1, wherein the executing includes recording, when allocating the resources of the second information processing apparatus in accordance with respective items of task information of the plurality of information processes to be executed, a resource allocation sequence in accordance with the task information together with the accumulative value of the virtual run time on a resource-by-resource basis.

3. The information processing method according to claim 2, wherein the executing includes allocating, when allocating the resources of the second information processing apparatus to the plurality of information processes in accordance with the respective items of task information of the plurality of information processes to be executed, non-usage time up to usage ending time of the resource exhibiting the earliest usage ending time of the resource allocated in accordance with the respective items of task information to the resource not yet receiving the allocation of any information process, and accumulating the non-usage time per resource, and the information processing method further comprises calculating, by the processor, a usage ratio per resource from the accumulative value of the virtual run time and the accumulative value of the non-usage time on the resource-by-resource basis of the second information processing apparatus.

4. A non-transitory computer-readable recording medium having stored therein a program for causing a computer to execute a process comprising:

acquiring, when a first information processing apparatus executes a plurality of information processes, sets of execution information of the respective information processes, the execution information recorded as task information being structured to contain the resources used in the respective information processes and usage time of the resources in a sequence of switching over with each switchover of the resource used in the information process;

converting the usage time in each set of execution information into usage time on a second information processing apparatus in accordance with ability value information of the resources of the first information processing apparatus and ability value information of the resources of the second information processing apparatus;

executing, with respect to the plurality of executed information processes, a resource allocation process based on the sets of execution information corresponding to the plurality of information processes, the resource allocation process being allocating the resource of the second information processing apparatus that corresponds to the resource of the first information processing apparatus to a first information process during the converted usage time in the resource switchover sequence in accordance with the task information recorded in the execution information corresponding to the first information process, allocating the resource of the second information processing apparatus to a second information process for idle time not allocated to the first information process during the converted usage time in the resource switchover sequence in accordance with the task information recorded in the execution information corresponding to the second information process, and accumulating periods of virtual run time of the allocated resources; and estimating execution time when executing the plurality of information processes on the second information processing apparatus on the basis of an accumulative value obtained by accumulating the virtual run time of the allocated resources up to tail task information contained in the respective sets of execution information corresponding to the plurality of information processes.

5. The non-transitory computer-readable recording medium according to claim 4, wherein the executing includes recording, when allocating the resources of the second information processing apparatus in accordance with respective items of task information of the plurality of information processes to be executed, a resource allocation sequence in accordance with the task information together with the accumulative value of the virtual run time on a resource-by-resource basis.

6. The non-transitory computer-readable recording medium according to claim 5, wherein the executing includes allocating, when allocating the resources of the second information processing apparatus to the plurality of information processes in accordance with the respective items of task information of the plurality of information processes to be executed, non-usage time up to usage ending time of the resource exhibiting the earliest usage ending time of the resource allocated in accordance with the respective items of task information to the resource not yet receiving the allocation of any information process, and accumulating the non-usage time per resource, and the computer is made to further execute calculating a usage ratio per resource from the accumulative value of the virtual run time and the accumulative value of the non-usage time on the resource-by-resource basis of the second information processing apparatus.

7. An information processing apparatus comprising:

an acquiring unit configured to acquire, when a first information processing apparatus executes a plurality of information processes, sets of execution information of the respective information processes, the execution information recorded as task information being structured to contain the resources used in the respective information processes and usage time of the resources in a sequence of switching over switchover of the resource used in the information process;

a converting unit configured to convert the usage time in each set of execution information into usage time on a second information processing apparatus in accordance with ability value information of the resources of the first information processing apparatus and ability value information of the resources of the second information processing apparatus;

an execution unit configured to execute, with respect to the plurality of executed information processes, a resource allocation process based on the sets of execution information corresponding to the plurality of information processes, the resource allocation process being allocating the resource of the second information processing apparatus that corresponds to the resource of the first information processing apparatus to a first information process during the converted usage time in the resource switchover sequence in accordance with the task information recorded in the execution information corresponding to the first information process, allocating the resource of the second information processing apparatus to a second information process for idle time not allocated to the first information process during the converted usage time in the resource switchover sequence in accordance with the task information recorded in the execution information corresponding to the second information process, and accumulating virtual run time of the allocated resources; and an estimation unit configured to estimate execution time when executing the plurality of information processes on the second information processing apparatus on the basis of an accumulative value obtained by accumulating the virtual run time of the allocated resources up to tail task information contained in the respective sets of execution information corresponding to the plurality of information processes.

8. The information processing apparatus according to claim 7, wherein the execution unit is configured to record, when allocating the resources of the second information processing apparatus in accordance with respective items of task information of the plurality of information processes to be executed, a resource allocation sequence in accordance with the task information together with the accumulative value of the virtual run time on a resource-by-resource basis.

9. The information processing apparatus according to claim 8, wherein the execution unit is configured to allocate, when allocating the resources of the second information processing apparatus to the plurality of information processes in accordance with the respective items of task information of the plurality of information processes to be executed, non-usage time up to usage ending time of the resource exhibiting the earliest usage ending time of the resource allocated in accordance with the respective items of task information to the resource not yet receiving the allocation of any information process, and to accumulate the non-usage time per resource, and the information processing apparatus further comprising a calculation unit configured to calculate a usage ratio per resource from the accumulative value of the virtual run time and the accumulative value of the non-usage time on the resource-by-resource basis of the second information processing apparatus.

\* \* \* \* \*